(12) United States Patent
Despesse

(10) Patent No.: US 10,044,069 B2
(45) Date of Patent: Aug. 7, 2018

(54) BATTERY WITH INDIVIDUAL CELL MANAGEMENT

(75) Inventor: Ghislain Despesse, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 77 days.

(21) Appl. No.: 14/002,795

(22) PCT Filed: Mar. 2, 2012

(86) PCT No.: PCT/EP2012/053684
§ 371 (c)(1),
(2), (4) Date: Oct. 4, 2013

(87) PCT Pub. No.: WO2012/117110
PCT Pub. Date: Sep. 7, 2012

(65) Prior Publication Data
US 2014/0015488 A1    Jan. 16, 2014

(30) Foreign Application Priority Data

Mar. 2, 2011  (FR) ...................................... 11 51689
Jul. 1, 2011   (FR) ...................................... 11 55934

(51) Int. Cl.
*H02J 7/00*     (2006.01)
*H01M 10/42*    (2006.01)
(Continued)

(52) U.S. Cl.
CPC ..... *H01M 10/4207* (2013.01); *H01M 10/425* (2013.01); *H01M 10/4257* (2013.01);
(Continued)

(58) Field of Classification Search
CPC ........... H01M 10/0445; H01M 10/637; H01M 10/4257; H01M 10/4207
See application file for complete search history.

(56) References Cited

U.S. PATENT DOCUMENTS 4,709,202 A * 11/1987 Koenck ................... G06F 1/263
                                                    320/112
5,739,669 A    4/1998 Brulhardt et al.
(Continued)

FOREIGN PATENT DOCUMENTS

CN      1319189 A      10/2001
DE      3106171 A1 *   9/1982
(Continued)

OTHER PUBLICATIONS

Notice of Reasons for Rejection issued by Japanese Patent Office for related Japanese application 2013-555895 dated Dec. 15, 2015. English translation.
(Continued)

*Primary Examiner* — Samuel Berhanu
*Assistant Examiner* — Tarikh Rankine
(74) *Attorney, Agent, or Firm* — Haug Partners LLP

(57) ABSTRACT

The invention relates to a battery comprising a plurality of modules arranged in series, characterized in that a module comprises a cell and a cell switch arranged in series with the cell, and in that a circuit for controlling the cell switch is electrically fed directly by at least one cell of a module of the battery.

25 Claims, 30 Drawing Sheets

(51) Int. Cl.
*B60L 11/18* (2006.01)
*H01M 10/44* (2006.01)
*H01M 10/48* (2006.01)

(52) U.S. Cl.
CPC ....... *H01M 10/441* (2013.01); *H01M 10/482* (2013.01); *H01M 10/486* (2013.01); *H02J 7/007* (2013.01); *H02J 7/0013* (2013.01); *H02J 7/0024* (2013.01); *B60L 11/1861* (2013.01); *B60L 11/1866* (2013.01); *B60L 2240/545* (2013.01); *B60L 2240/547* (2013.01); *H01M 2010/4271* (2013.01); *H02J 7/0044* (2013.01); *Y02T 10/7055* (2013.01); *Y02T 10/7061* (2013.01)

(56) References Cited

U.S. PATENT DOCUMENTS

| | | | |
|---|---|---|---|
| 6,034,506 A * | 3/2000 | Hall | 320/117 |
| 6,404,166 B1 | 6/2002 | Puchianu | |
| 7,962,212 B2 * | 6/2011 | Signoff | A61N 1/378 320/121 |
| 9,083,187 B2 | 7/2015 | Ito et al. | |
| 2002/0135250 A1 * | 9/2002 | Pardo | H02M 7/483 310/111 |
| 2002/0146617 A1 * | 10/2002 | Johnson et al. | 429/50 |
| 2003/0071523 A1 * | 4/2003 | Silverman | H01M 2/20 307/150 |
| 2005/0253458 A1 * | 11/2005 | Omae | H01M 6/36 307/10.1 |
| 2006/0076923 A1 * | 4/2006 | Eaves | G01T 1/2018 320/112 |
| 2006/0192529 A1 * | 8/2006 | Kimura | H02J 7/0026 320/116 |
| 2007/0062744 A1 * | 3/2007 | Weidenheimer et al. | 180/65.2 |
| 2007/0120529 A1 | 5/2007 | Ishikawa et al. | |
| 2007/0247117 A1 * | 10/2007 | Morita et al. | 320/132 |
| 2007/0287043 A1 * | 12/2007 | Marsh | B82Y 30/00 429/431 |
| 2008/0090133 A1 * | 4/2008 | Lim | H02J 7/0016 429/50 |
| 2008/0266913 A1 * | 10/2008 | Brotto et al. | 363/60 |
| 2009/0066291 A1 * | 3/2009 | Tien | H02J 7/0016 320/118 |
| 2009/0079412 A1 | 3/2009 | Kuo | |
| 2009/0289598 A1 | 11/2009 | Tsukamoto et al. | |
| 2010/0037936 A1 | 2/2010 | Becker et al. | |
| 2010/0072950 A1 * | 3/2010 | Tatebayashi et al. | 320/134 |
| 2010/0090649 A1 * | 4/2010 | Sardat | B60L 3/06 320/118 |
| 2010/0127570 A1 | 5/2010 | Hadar et al. | |
| 2010/0181966 A1 * | 7/2010 | Sakakibara | B25F 5/00 320/136 |
| 2012/0038322 A1 * | 2/2012 | Moorhead | B60L 11/1861 320/136 |
| 2012/0200163 A1 | 8/2012 | Ito et al. | |

FOREIGN PATENT DOCUMENTS

| | | |
|---|---|---|
| FR | 2 740 264 A | 4/1997 |
| FR | 2 926 168 A | 7/2009 |
| JP | 6-283210 | 10/1994 |
| JP | 2000-354333 A | 12/2000 |
| JP | 2008-148387 A | 6/2008 |
| JP | 4590520 B | 12/2010 |
| WO | WO 2009/018535 | 2/2009 |

OTHER PUBLICATIONS

Office Action issued by State Intellectual Property Office of the People's Republic of China for Application No. 201280019619.6, dated Apr. 1, 2015 with English Translation.

Office Action issued in corresponding Japanese Application No. 2013-555895 dated Oct. 25, 2016 and its English Translation.

Office Action issued in corresponding European Application No. 12708000.0 dated Oct. 13, 2017.

* cited by examiner

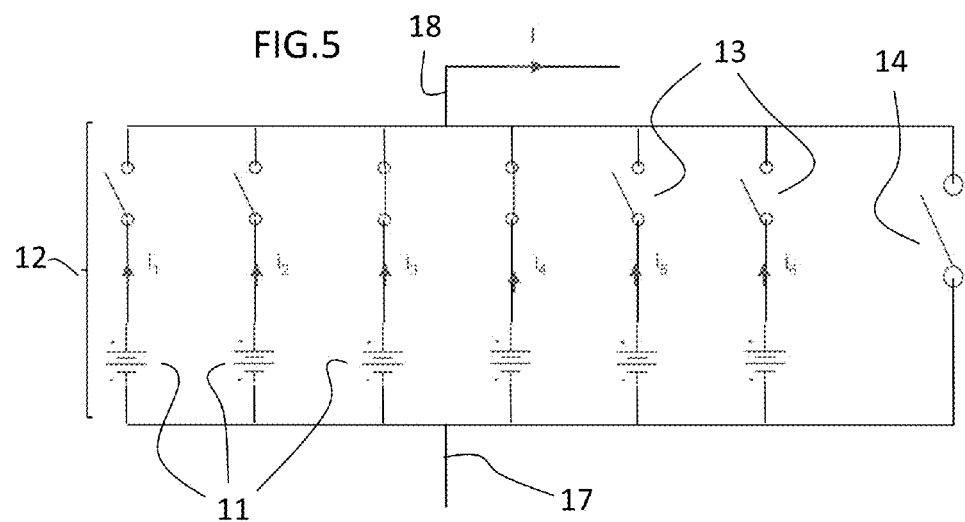
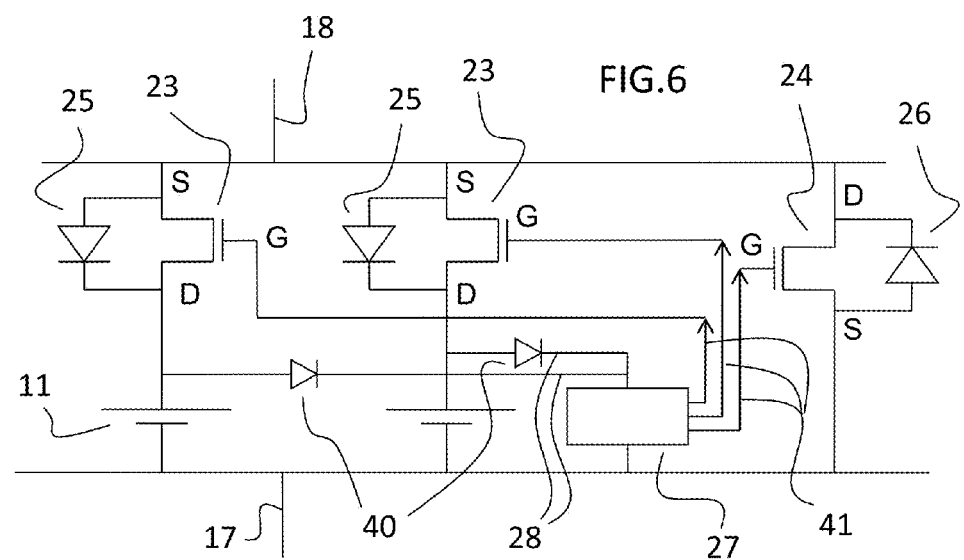

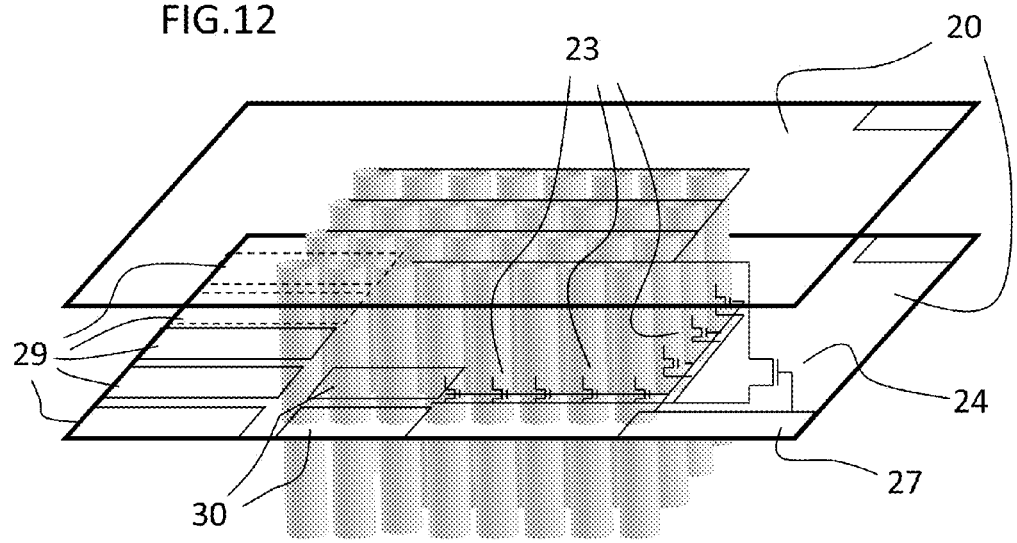
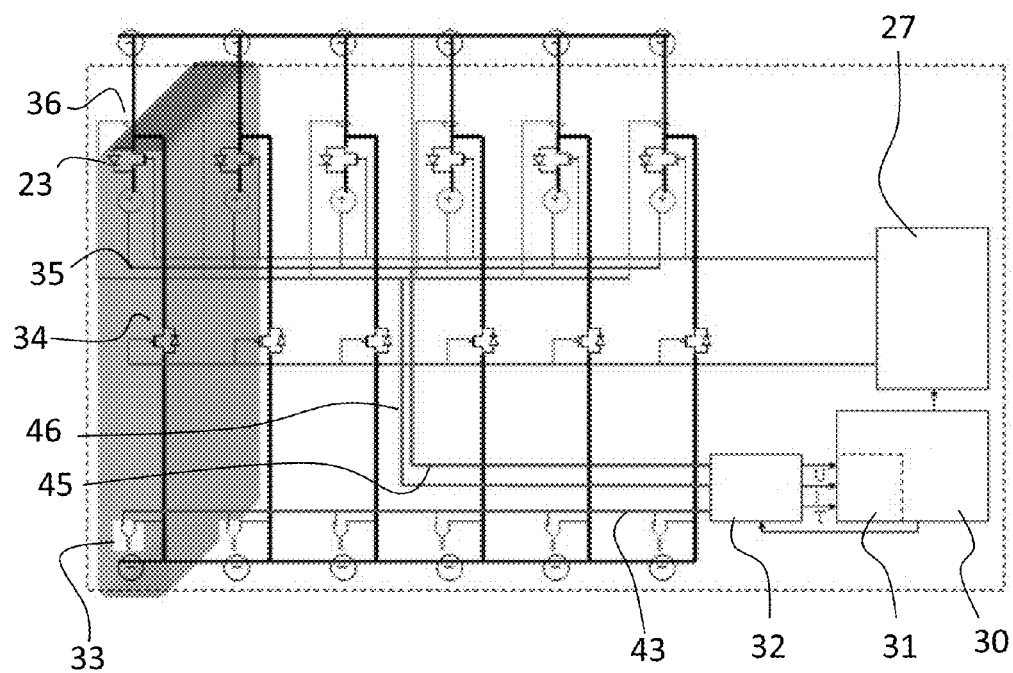

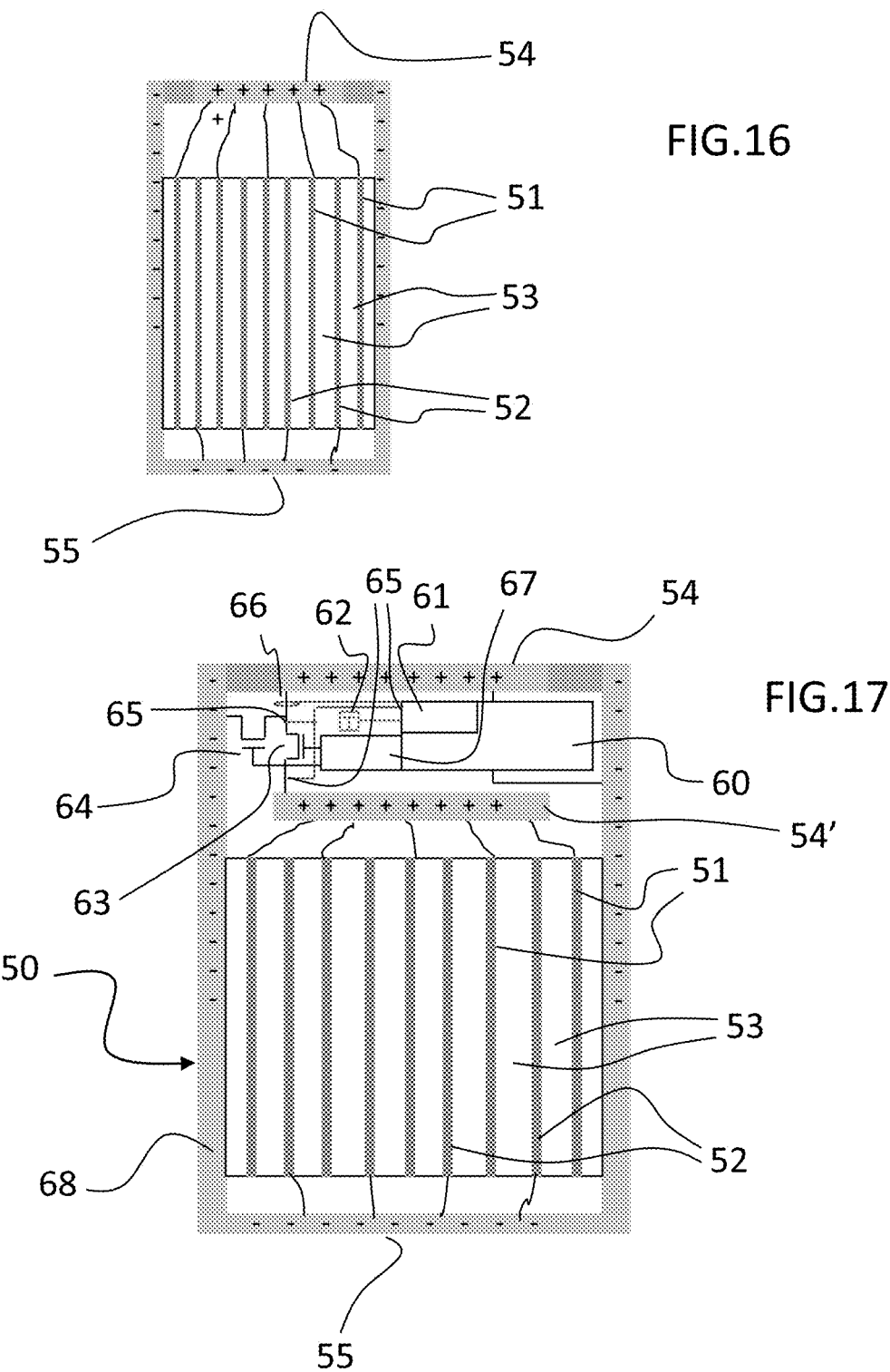

BATTERY WITH INDIVIDUAL CELL MANAGEMENT

This application is a 371 of PCT/EP2012/053684 filed on Mar. 2, 2012, published on Sep. 7, 2012 under publication number WO 2012/117110, which claims priority benefits from French Patent Application Number 1151689 filed Mar. 2, 2011 and French Patent Application Number 1155934 filed Jul. 1, 2011, both disclosures of which are incorporated herein by reference.

The invention concerns a battery. It particularly concerns a battery comprising a plurality of stages made up of a plurality of elementary cells. It also concerns a battery management method.

FIGS. 1 and 2 represent a prior art battery also known as a "battery pack". Such a battery pack, which will simply be referred to as a battery hereinafter, is made up of a multitude of elementary batteries. Such an elementary battery has a cylindrical shape, for example, comprises a multitude of positive and negative electrodes, taking the form of interleaved concentric cylinders or layers wound in the form of a spiral, separated by electrolyte and membrane layers. These elements represent the active part of the structure of the elementary battery, i.e. they form an assembly that contributes directly to the function of storing and delivering electrical energy. In this example, this active part is chemical in nature. Note that such an elementary battery, also called an elementary cell, may comprise an active part based on other chemical compounds or an active part of a capacitive nature. Furthermore, the active part of the elementary battery is disposed in a casing of which a first external face forms the positive terminal or first current collector of the battery and a second external face forms the negative terminal or second current collector. The function of this casing is to retain and support the active part of the battery and to seal it from the external environment. It encloses a physical assembly that forms a fixed, indissociable monolithic whole, the electrical connections of which cannot be modified by a user of the elementary battery, who sees an output current equal to the input current at its two terminals. This assembly formed by an active part and a casing with two terminals will therefore simply be referred to as an elementary cell and even more simply as a cell. A battery represented in FIGS. 1 and 2 more precisely comprises a plurality of stages or modules 2, disposed in series, and each module comprises a plurality of cells 1 disposed in parallel, as shown diagrammatically in FIG. 1.

FIG. 2 represents a common architecture of such a battery, in which each cell has a cylindrical shape and which is a lithium-ion type battery, for example. In this example, each module 2 comprises two rows of ten cells 1 in which the cylindrical lateral faces of adjacent cells are in contact. Moreover, the battery comprises eleven superposed modules 2 disposed so that the axes of the cylindrical cells of the various modules are aligned so that the cells are therefore aligned in their longitudinal direction. This arrangement therefore makes it possible to obtain a minimum overall size.

The use of such a prior art battery to power a motor 5 necessitates an intermediate AC or DC/DC converter type device 6 disposed between the battery and the motor 5, as represented in FIG. 3. The function of the device 6 is to adjust the output voltage of the battery to the requirements of the motor 5 in order to adapt to the speed and to the torque demanded of the motor. Note that the same principle applies to any load powered by the battery. Furthermore, during charging of the battery, an equivalent device must be used between the electrical mains and the battery to track the input voltage of the electrical mains. The use of these intermediate devices connected to the battery has a number of drawbacks, including the generation of losses at the level of the transistors and other components used, which leads overall to an additional consumption of energy. Moreover, this represents an additional bulk.

The management of such a prior art battery generally comprises observation of the output electrical parameters to deduce therefrom a diagnosis of its operation. This approach proves insufficient because it does not make it possible to determine accurately the areas of the battery, such as the modules or certain groups of cells, which are faulty, for example. The result of this in practice is poor optimization of the operation of the battery and very rapid reduction of its performance once it has a faulty part, often accompanied by rapid worsening of its state and premature aging.

To improve on this overall approach, there exist certain diagnostic methods which consist in observing certain parameters at the level of the modules of the battery. This second approach more precisely enables local observation of the particular behaviour of certain modules of the battery. Its implementation is complex, however, and necessitates the use of numerous electrical wires to connect a central diagnostic device to each module, which can induce high electrical hazards because the wires are liable to become heated or to be bared by rubbing and then produce short circuits, for example between two stages that are relatively far apart and have a high difference in potential. Moreover, this solution necessitates intermediate galvanic isolation to protect the central diagnostic device, the potential associated with the powered supply of which may differ very greatly from the potentials present in the battery. Finally, it enables only unsatisfactory action on the overall operation of the battery.

In addition to a conventional battery of this kind as described above, the document FR2926168 describes an electrical circuit comprising a plurality of switchable energy storage elements associated with energy generator means in order to supply a variable output voltage to adapt to the requirements of a motor. Such an approach brings flexibility of use compared to the conventional battery described above but does not provide any solution to any of the other drawbacks mentioned.

There is therefore a requirement for an improved energy storage solution making it possible to eliminate at least some of the drawbacks of the existing solutions, and the invention seeks to achieve some or all of the following objects.

A first object of the invention is to propose an energy storage solution that makes it possible to guarantee reliable operation in the long term.

A second object of the invention is to propose an energy storage solution that adapts easily to different usage requirements, such as variable requirements of a motor.

To this end, the invention provides a battery comprising a plurality of modules disposed in series, each module comprising a lower terminal adapted to be connected to a lower module and an upper terminal adapted to be connected to an upper module, each module comprising at least one branch between its lower terminal and its upper terminal comprising a cell, characterized in that it includes a switch disposed at the level of a given module and a control circuit of said switch that is electrically powered directly by at least one cell of the given module or an adjacent module.

The at least one switch may be one of the following:
 a cell switch for connecting or disconnecting a particular cell of the battery;
 a parallel switch for selectively bypassing a particular cell of the battery;

a module switch for selectively bypassing a module of the battery;
a switch for selectively bypassing a plurality of modules of the battery simultaneously;
a switch for selectively inverting the battery output voltage;
a series/parallel changeover switch for disposing in series or in parallel certain sub-parts of the battery;
an additional switch for disposing two cells in series or in parallel.

The invention also relates to a method of managing a battery as described above, characterized in that it comprises a step of electrically powering a control circuit of a switch disposed at the level of a given module of the battery from at least one cell of the given module or an adjacent module.

The invention is more precisely defined by the claims.

These objects as well as features and advantages of the present invention are described in detail in the following description of particular embodiments given by way of nonlimiting example with reference to the appended figures, in which:

FIG. 5 shows diagrammatically a module of the battery in accordance with this embodiment of the invention.

FIG. 6 shows more precisely an electrical circuit diagram for using the module shown in FIG. 5.

FIG. 12 shows a second variant of this embodiment of the invention.

FIG. 13 shows in more detail the architecture of the electronic card associated with a module in accordance with this second variant of this embodiment of the invention.

FIG. 16 shows the internal structure of a prior art lithium-ion type cell.

FIG. 17 shows the internal structure of a lithium-ion type cell in accordance with a second embodiment of the invention.

In accordance with an advantageous aspect of the invention, at least one switch is integrated into some or all of the cells of a battery to enable, by means of a control device of this at least one switch, use or non-use of certain cells as a function of requirements, this control device comprising at least one part powered locally by at least one cell of the battery. This enables optimization of the battery as well as improvement of its performance and its durability.

In the following figures, in order to simplify the description, the same references are used for identical or similar elements in each embodiment of the invention.

Figure 4:
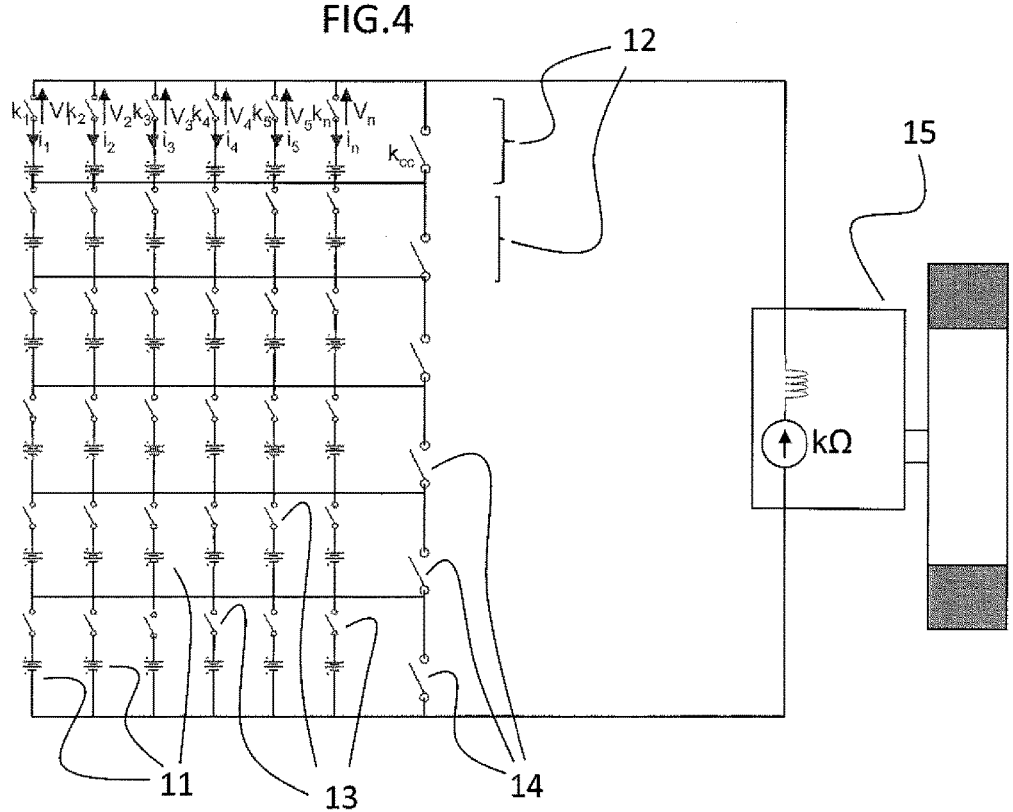
FIG. 4 shows diagrammatically a battery in accordance with one embodiment of the invention.

FIG. 4 shows diagrammatically an embodiment of the invention in which a battery comprises a multitude of cells 11 organized into a plurality of modules 12 as in the prior art. However, each cell 11 is associated with a switch 13 disposed in series that is dedicated to it, which makes it possible to disconnect the cell from the rest of the battery by opening the switch: for this reason, it will be referred to hereinafter as the "cell switch 13". Moreover, each module 12 also comprises a switch 14 in parallel with the cells 11 of the module 12, thus making it possible to short-circuit the whole of the module: for this reason, it will be referred to hereinafter as the "module switch 14". The use of such a battery to power a load 15, such as a motor, makes it possible to dispense with the intermediate converters used in the prior art, as can be seen in FIG. 4. This operation is explained hereinafter.

FIG. 5 shows in more detail a module 12 of the battery in accordance with this embodiment of the invention. It comprises a lower terminal 17 connected to the adjacent module below it and an upper terminal 18 for series connection to the adjacent module above it. In accordance with this example, this module comprises six cells 11 disposed in parallel. It could naturally comprise instead any other number of cells. To be more precise, the module comprises firstly six parallel branches disposed between its upper terminal 18 and its lower terminal 17 on which are disposed a cell 11 and a cell switch 13 adapted to disconnect selectively the cell from one of the two terminals 17, 18. It comprises a seventh branch on which is disposed a module switch 14 in parallel with the cells adapted to shunt the cells. In the example shown, only the third and fourth cells are being used because their respective cell switches 13 are closed and all the other cell switches are open. Moreover, the module switch 14 is open to place the module 12 in its normal configuration of storing or returning energy.

FIG. 6 shows more precisely an electrical circuit diagram for implementing the arrangement explained above with reference to FIG. 5. In this FIG. 6, to simplify the figure, only two cell switches 13 are represented. The various switches 13, 14 are produced by means of power transistors 23, 24, preferably NMOS type transistors, which feature increased conductivity in their conducting state compared to PMOS transistors that could be used instead. Alternatively, it is also possible to use other types of transistors such as bipolar transistors, FET, JFET, IGBT, etc. It is also possible to place a plurality of transistors in parallel to carry the current better. There naturally exist as many cell transistors 23 as cell switches 13 as well as a module transistor 24 to form the module switch 14. To represent their characteristic of allowing a reverse current to flow, all these transistors 23, 24 are associated with diodes 25, 26 connected in parallel, which are either integrated into the transistors if they are NMOS discrete power transistors or separate diodes. Finally, a control circuit 27, generally known as a "driver" circuit, is powered electrically via connections 28 enabling it to recover a voltage difference substantially corresponding to the voltage of the most highly charged cell, slightly reduced by a voltage drop (for example close to 0.6 V) at the level of the diodes 40 disposed on the connections 28. The function of this control circuit is to generate control signals 41 for actuating the various transistors 23, 24, thus implementing a switch control function. In a similar manner that is not shown, to clarify the figures, all the electronic components of the module may be powered in accordance with the same solution, e.g. a computer for estimating the state of the switches, a communication system, etc.

The operation of this device is explained next. When it is used in a circuit similar to that from FIG. 4, in the usual operating configuration, at least one of the cell transistors 23 is closed and the module transistor 24 is open, which enables the cells 11 associated with the closed cell transistors 23 to deliver a voltage and a current that passes through the closed transistors and finally contributes to powering the load 15. A current flows from the lower terminal 17 to the upper terminal 18. On the other hand, if all the cell transistors 23 are open and the module transistor 24 is closed, the current will pass through this module transistor and the cells of the module are isolated, not contributing to the generation of the supply current. If all the transistors 23, 24 are open, the current consumed, i.e. the battery discharge current, passes through the antiparallel diode 26 associated with the module 24 and the voltage at the terminals 17, 18 of the module remains equal to approximately −0.6 V (the voltage of the upper terminal 18 is approximately 0.6 V below that of the lower terminal 17: this voltage drop is caused by the antiparallel diode 26 associated with the module transistor 26). Finally, closing a cell transistor 23 when the module transistor 24 is also closed is avoided for safety reasons in order not to short circuit the cell 11. Accordingly, for any change of the cell transistors 23 that are closed toward a situation in which the module transistor 24 is closed, or vice-versa, there is preferably an intermediate step of opening all the transistors for a short time period, for example a few nanoseconds.

Moreover, the device represented in this FIG. 6 is also adapted to operate in cell charging mode, in which the current is reversed and flows from the upper terminal 18 to the lower terminal 17. In the normal situation, the cell transistors 23 are closed and the module transistor 24 is open, which allows a current to flow through the cell transistor 23 to charge the cells 11. On the other hand, if all the cell transistors 23 are open and the module transistor 24 is closed, the current passes through this module transistor and the whole of the module is isolated and is not charged. If all the transistors 23, 24 are open, a current passes through the antiparallel diodes 25 associated with the cell transistors 23 and the voltage at the terminals 17, 18 of the module remains equal to that of the cells (for example 3.3 V) plus the voltage at the terminals of the diodes 25 (for example +0.6 V). Finally, during this charging phase closing a cell transistor 23 when the module transistor 24 is also closed is likewise avoided for safety reasons so as not to short circuit the cell 11.

It is interesting to note that the voltage of a module remains low, even when all the transistors are open, which makes it possible to use transistors withstanding relatively low voltages and of relatively low cost, the resistance of which in the conducting state is very low, which induces low losses. This is notably the case if the cells 11 have a voltage less than 40 V.

Figure 7:
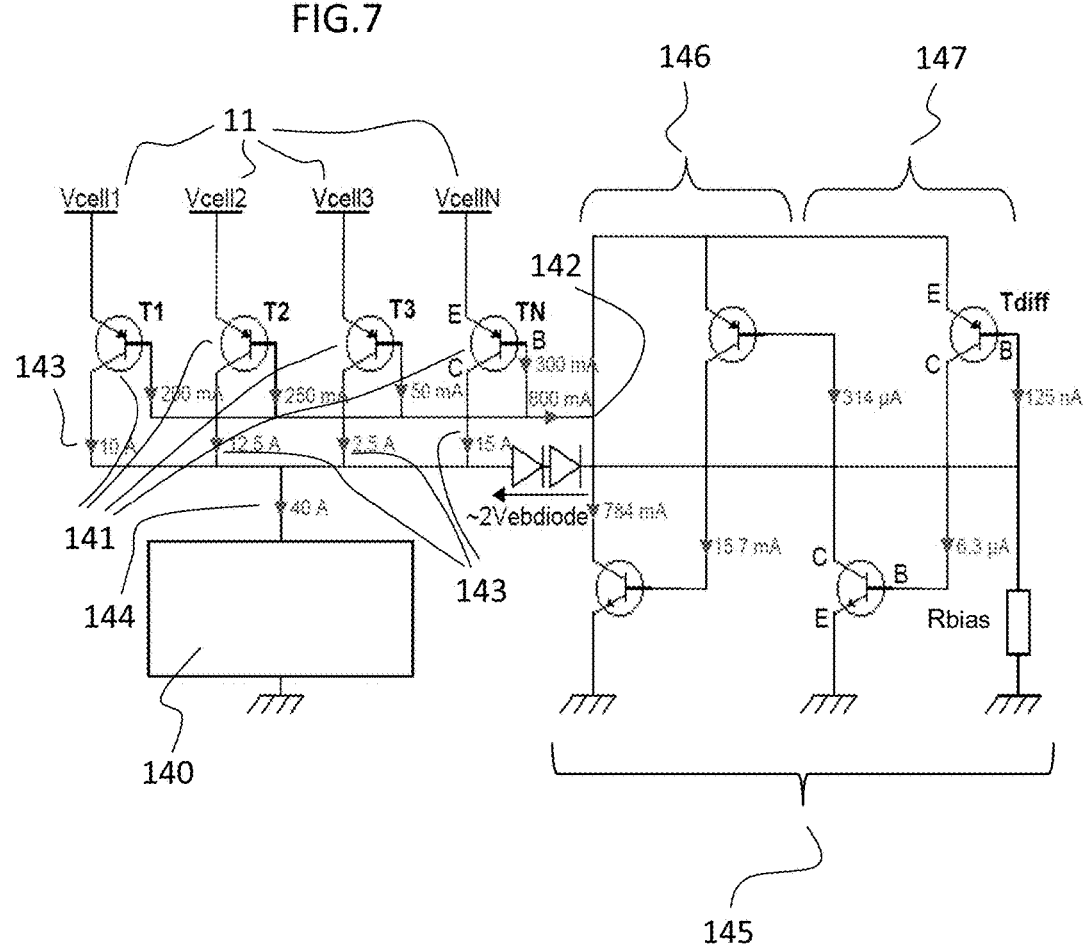
FIG. 7 shows the electrical circuit diagram for using the module shown in FIG. 5 in accordance with a variant embodiment.

FIG. 7 shows a variant of the preceding electrical circuit diagram for implementing the same principle differently, notably making it possible to obtain a local power supply of the electronic components 140 of the circuit from the voltage stored by the cells of the module concerned, or even an adjacent module. For reasons of simplification, the electronic components are not shown in detail, but they comprise at least one control circuit and switches as explained above. In this variant, a bipolar PNP transistor 141 is associated with each cell 11 of the module. All these transistors 141 are controlled by the same current from a terminal 142 of a control device 145. There results from this at the output 143 of each transistor a current that depends on the voltage of each cell 11, i.e. on the state of charge and the state of health of each cell 11. These currents are added in order to power the electronic components by a resulting current 144. The transistors 141 are controlled in such a way that the final supply current 144 reaches a required value. The solution makes it possible to load the various cells of the module as a function of their state, of their available voltage.

This solution moreover avoids having the voltage drop between the voltage available at the level of the module and that which can be used by the electronic components because of the use of diodes, as in the embodiment described above with reference to FIG. 6. This voltage drop may notably be a problem in an embodiment in which the cells are low-voltage cells, for example 1.5 V cells.

The control device 145 comprises an amplifier device comprising two amplifier stages 146 and 147 in this embodiment to make it possible to control the power supply device described above without necessitating too high a power, which would generate a voltage drop at the level of the module, which is avoided in this embodiment. To this end, a first very low current is taken from the module at the level of a first transistor Tdiff and then amplified by a cascade of amplifiers to reach the required control voltage at the terminal 142. The control current at the terminal 142 is adjusted automatically as a function of the current demand of the electronic components 140, which limits the latter current to what is strictly necessary and in real time and therefore limits the average consumption linked to this control function.

The numerical values illustrate an embodiment making it possible to achieve a supply current of 40 A using a control current of 125 nA.

In accordance with this embodiment of the invention, each cell further comprises at least one sensor for measuring a parameter characteristic of the state of the cell. This measurement sensor may for example measure the voltage and/or current and/or temperature at the level of the cell concerned. Each measurement sensor is moreover connected by a communication device to a local and/or remote intelligent device, such as a microcontroller type computer, which receives the measured values and implements a battery management method, described in more detail later, to determine an optimized mode of operation of the battery, taking into account the measurements effected. This optimized mode of operation consists in fact in determining the switches 13, 14 that must be open or closed. This configuration of the various switches of the battery may be modified in real time. This solution therefore makes it possible to bypass defective or overheated cells, for example, route the current within each module and balance each of the cells of the battery in real time. Note that the average current demand of a load 15 powered by the battery is generally much lower than the peak current demand in a consumption spike, which enables the battery to function satisfactorily most of the time with a relatively large number of cells disconnected, i.e. with the associated cell switch 13 open, or even with modules disconnected, i.e. with the associated module switch 14 closed, if the whole of a module is considered defective or overheated, for example.

Figure 8:
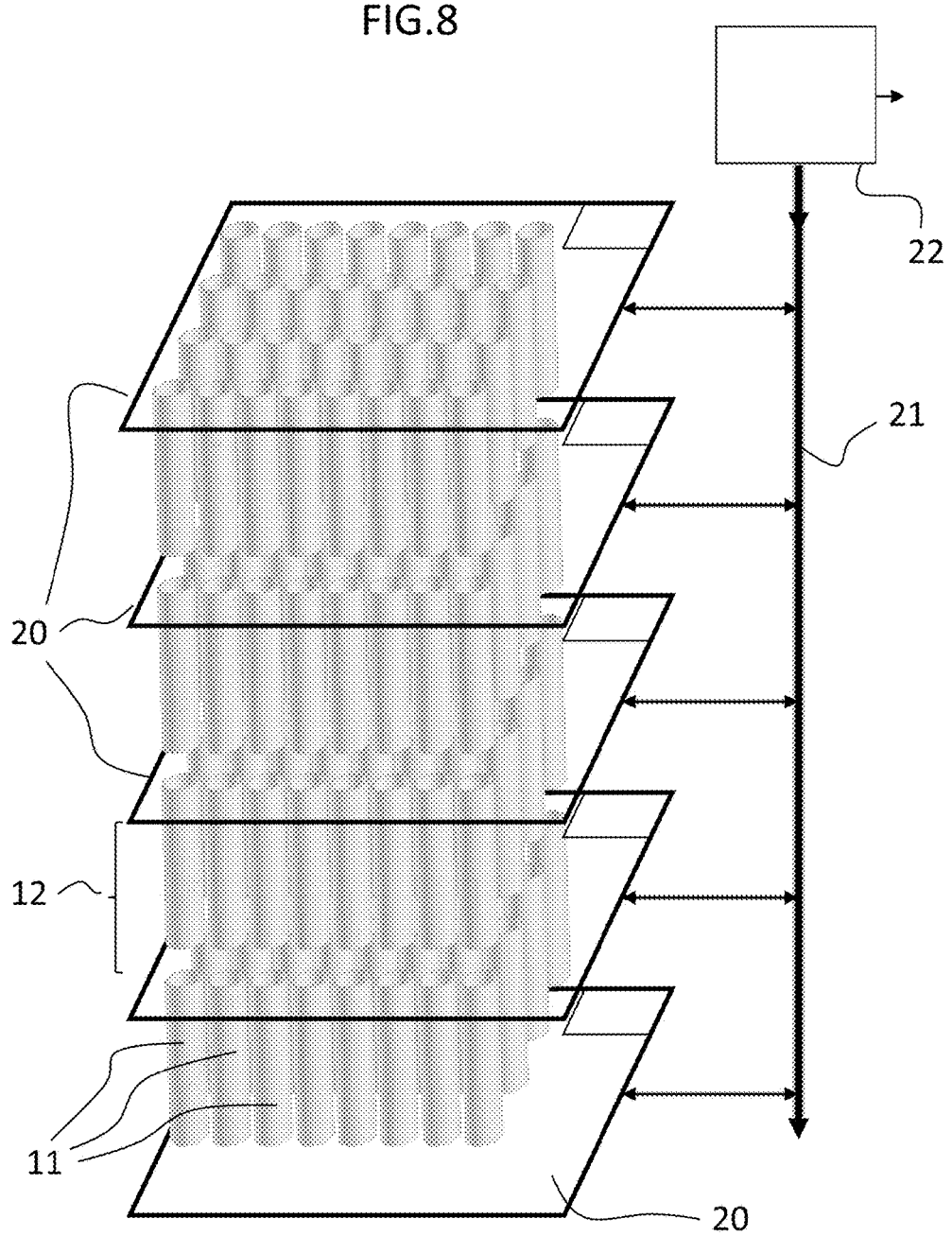
FIG. 8 shows the physical implementation of the electrical functions of the invention in the architecture of a battery in accordance with one embodiment of the invention.
Figure 9:
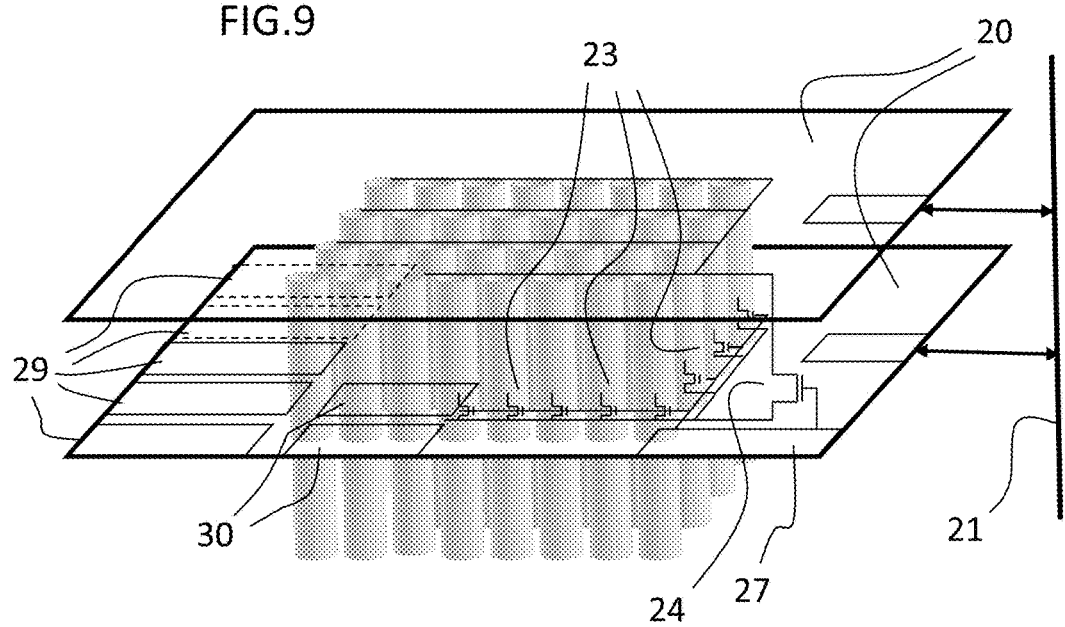
FIG. 9 shows more precisely the components present on each electronic card of this embodiment of the invention.

FIGS. 8 to 10 show possible physical embodiments of electrical functions added by the invention in the architecture of a battery in accordance with one embodiment of the invention.

FIGS. 8 and 9 show a first embodiment in which an electronic card 20, which comprises the components described above, is added for each module of the battery. This electronic card takes the form of a printed circuit positioned on the lower or upper face of each module. Thus the battery comprises an electronic card 20 between each module.

Then, in accordance with the embodiment shown in FIGS. 8 and 9, each electronic card is connected by a communication bus 21 to a central computer 22 which receives the measurements effected locally in a module of the battery and implements a battery management method notably comprising the transmission of commands for opening and/or closing switches of the battery. This transfer of data via the communication bus 21 may necessitate multiplexing and digitization of the data as well as galvanic isolation (by means of a transformer or optocoupler). Moreover, a control circuit 27 is placed on each electronic card and constitutes an intermediate element between the computer 22 and the switches, enabling adaptation of the voltage transmitted to the transistor 23, 24 implementing the switch function for executing commands from the computer. These control circuits 27 can moreover integrate security functions to prevent closing a module switch 14 when the cell switches 13 are closed, for example, to prevent short circuits.

FIG. 9 shows more precisely the components present on each electronic card, which comprises measurement sensors 29 for measuring temperature, voltage and current, one or more processing circuits 30 for estimating the level of charge of each cell, for example, determining the relevance of using each cell or not, etc. The electronic card 20 further comprises a control circuit 27 enabling actuation of the various transistors 23, 24 forming the switches 13, 14. Finally, it comprises a communication interface connected to the communication device in order to communicate with the central computer 22. The control circuit 27 and the processing circuit 30 are notably powered directly by at least one cell of the module via a power distribution arrangement on the electronic card 20, as described in detail above.

Figure 10A:
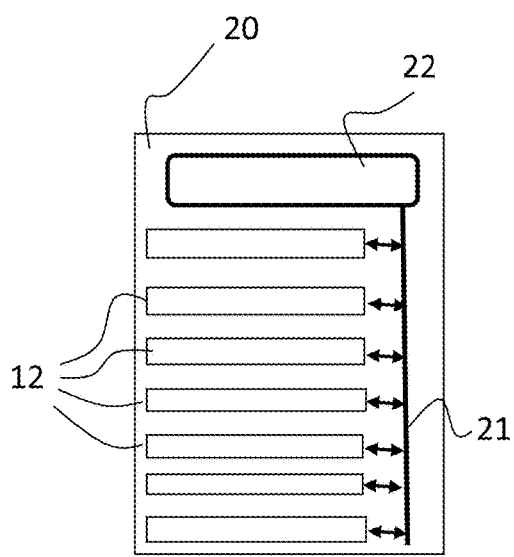
FIGS. 10a and 10b show a variant of this embodiment of the invention.
Figure 10B:
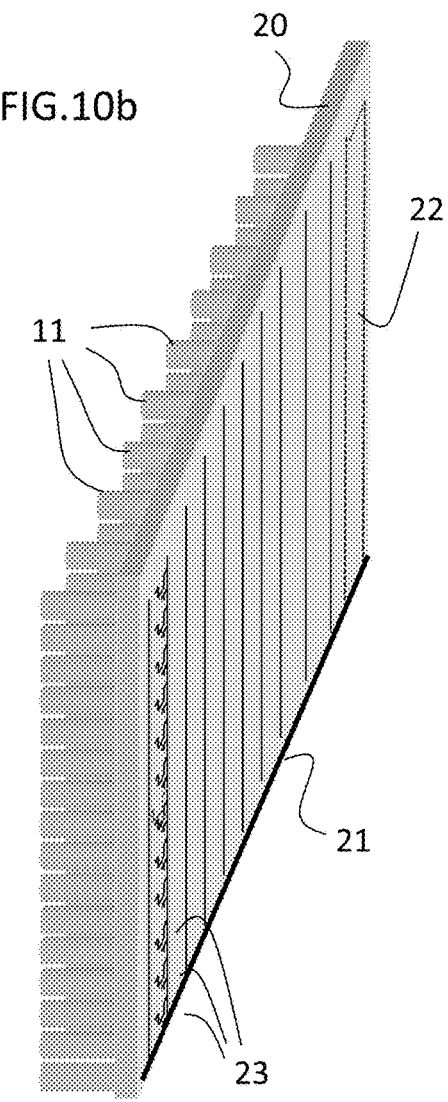

FIGS. 10a and 10b show a variant embodiment in which the electronic functions of each electronic card of the embodiment described above are grouped on a single electronic card 20 on which the cells are disposed so that their axis is perpendicular to the electronic card 20. FIG. 10a is a plan view, making it possible to see the distribution of the modules 12 on the card 20, while FIG. 10b is a perspective view from the rear, making it possible to distinguish different cells 11 as well as certain electronic components such as the cell transistors 23, sketched in non-exhaustive manner to simplify the representation of the electronic circuit card 20. However, the latter comprises all the components described above. The communication bus 21 extends the full length of the card to the central computer 22, positioned toward a free edge of the electronic card 20. This communication bus 21 can be physically isolated from the electronics of the modules by establishing a strip of printed circuit dedicated to the communication bus, separated from the electronic components of the various modules, for example separating their ground connections, and/or maintaining a safety distance between the two parts. Only components involved in the communication between these two parts, such as transformers or optocouplers, continue to straddle these two parts to enable this communication at the same time as guaranteeing galvanic isolation. The various components associated with each module 12 are powered locally by distribution of power from at least one cell of the battery. This distribution of power is preferably provided for each module, on the basis of the voltage available at the level of the module concerned, i.e. coming from at least one cell of the module.

Figure 11:
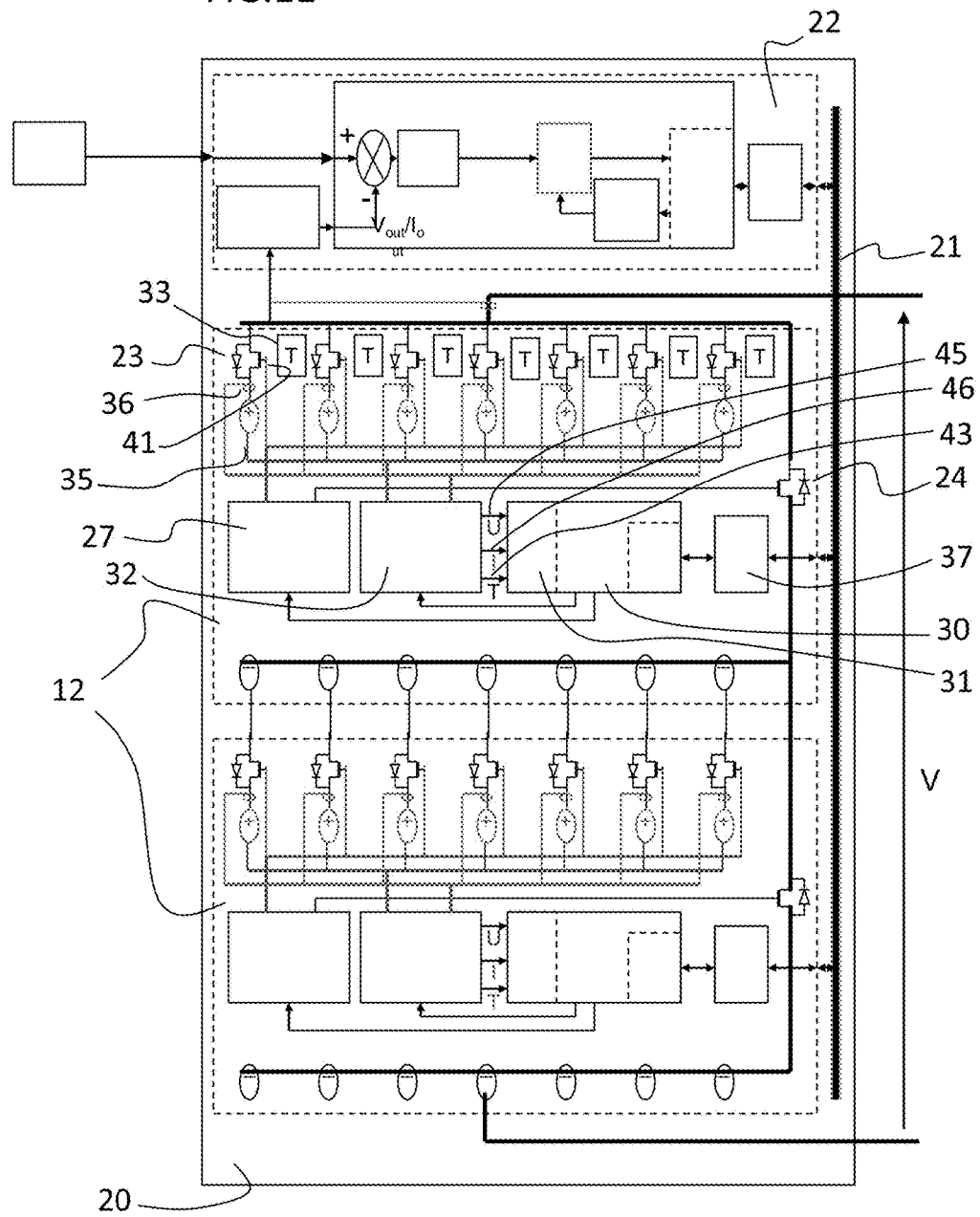
FIG. 11 shows in more detail the architecture of the electronic card in accordance with this variant of this embodiment of the invention.

FIG. 11 shows in more detail the architecture of the electronic card 20 associated with two modules 12, each comprising seven cells in this example. For each cell a cell transistor 23 is provided in series with the cell and a module transistor 24 in parallel is provided for each module 12, as described above. Moreover, a temperature sensor 33, a voltage sensor 35 and a current sensor 36 are provided for each cell. The measurements effected by these three sensors 33, 35, 36 are transmitted to a local processing circuit 30 via a multiplexer 32 over three communication channels 43, 45, 46, respectively. Note that the connections have been simplified in the figures for clarity, but in reality there is a bundle of wires to provide a connection to each sensor and to each voltage. Moreover, the voltage of the module is also advantageously measured to deduce therefrom the voltages present at the level of the transistors. The processing circuit 30 therefore receives this data at the level of a communication input 31 effecting analogue-to-digital conversion, of the "ADC input" type; alternatively, these signals arrive already digitized, this digitization being effected at the level of the multiplexer 32. In accordance with one possible embodiment, the processing circuit 30 can be a microcontroller having a sufficient number of inputs/outputs to interrogate all of the sensors. All the transistors 23, 24 are controlled by a power control circuit 27 that transmits control signals 41 to them at the command of the processing circuit 30. Finally, the processing circuit 30 is connected to the central computer 22 via the communication bus 21 and an interface 37 providing galvanic isolation. All these components associated with one module 12 are powered by the voltage of at least one of the cells of the module. As has been described, each module 12 of the battery has its own intelligence thanks to its processing circuit 30 and therefore contributes to the battery management process, in co-operation with the central computer 22 that controls all of the modules. The latter computer is described in more detail later with reference to FIG. 24.

Moreover, all the power components associated with a module are powered directly by the voltage available at the level of the corresponding module. This local powering by at least one cell of a module concerns all the components necessitating power among those described above by way of example with reference to FIG. 11, such as notably the transistor control circuit 27. Such a control circuit, powered by its associated module, is then electrically isolated from the other modules and/or electrical potentials external to the module. Such an embodiment has the advantage of eliminating the risk of driving a certain transistor with a potential very different from that of the stage, which could lead to its destruction or to short circuiting it. Moreover, this solution has the additional advantage of making it possible to reduce the connections between the components of the control circuit and the power supply, because it is possible to group them at a short distance from each other and from the voltage source, notably by positioning the transistors as close as possible to the cells to be connected. Finally, the use of very short connections also greatly reduces the risk of short circuits, for example between two modules.

Likewise, a communication device powered by the stage can make it possible to communicate with the other stages and/or with a central system via a highly isolated connection to prevent electrical hazards (short circuits between stages, deterioration of the central system placed at a potential very different (by a few kV) from that of a stage of the battery, electrical hazard for a repairer). In contrast to a pulse transformer that would make it possible to control the power transistors via galvanic isolation, the use of a communication device powered by the module makes it possible to interpret the signals received (decoding of the address, the data), to code the signals to be transmitted and to share the communication lines, whereas the pulse transformer merely makes it possible to switch the power transistor "on" or "off" with an individual connection line for each transistor. The communication device may for example be an I2C interface present in numerous microcontrollers, which is connected to a shared communication bus in each stage via a galvanic isolation arrangement. It is also powered locally, by at least one cell of the battery.

In the example described above, the battery management method is implemented through cooperation of a local processing circuit 30 disposed at the level of each module and a central computer 22. All of the battery management functions could therefore be implemented by this combination. Various embodiments may therefore be conceived of, with certain management functions moved from the local level to the central level or vice-versa.

FIGS. 12 to 14 show a second variant in which the battery management method is implemented only locally, at the level of each module, or even at the level of each cell. This has the advantage of enabling more responsive driving of the various switches, avoiding the obligation to provide galvanic isolation between the electronic cards 20 and a central computer 22 and complex coding of the information to be transferred. FIG. 12 shows such a variant, in which each electronic card 20 comprises measurement sensors 29 for measuring temperature, voltage and current, one or more processing circuits 30 for estimating the level of charge of each cell, for example, to determine the relevance of using or not each cell, etc. The electronic card further comprises a control circuit 27 for actuating the various transistors 23, 24 forming the cell and module switches, powered locally from at least one cell of its module or an adjacent module.

FIG. 13 shows in more detail the architecture of the electronic card associated with a module 12, comprising six cells in this example. For each cell a cell transistor 23 is provided, disposed in series with the cell, as explained above. Moreover, a temperature sensor 33, a voltage sensor 35 and a current sensor 36 are also provided at the level of each cell. The measurements effected by these three sensors 33, 35, 36 are transmitted to a processing circuit 30 via a multiplexer 32 over three communication channels 43, 45, 46, respectively, or alternatively a single shared channel.

The processing circuit 30 therefore receives this data at the level of a communication input 31 effecting analogue-to-digital conversion, of the "ADC input" type. In accordance with one possible embodiment, the processing circuit 30 can be a microcontroller having a sufficient number of inputs/outputs for interrogating all the sensors. Note that the single module transistor 24 is replaced in this embodiment by a plurality of parallel switches formed by transistors 34: in this variant, a parallel transistor 34 is disposed in parallel with each cell so as to minimize the length of the power tracks when these transistors 34 are activated. It is therefore apparent that in all the embodiments and variants thereof the module switches 14 may be replaced by parallel switches on each cell of the module. All these transistors 23, 34 are controlled by a control circuit 27 at the command of the processing circuit 30.

Figure 14A:
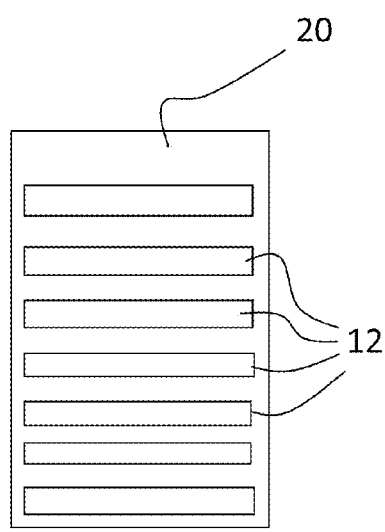
FIGS. 14a and 14b show a third variant of this embodiment of the invention.
Figure 14B:
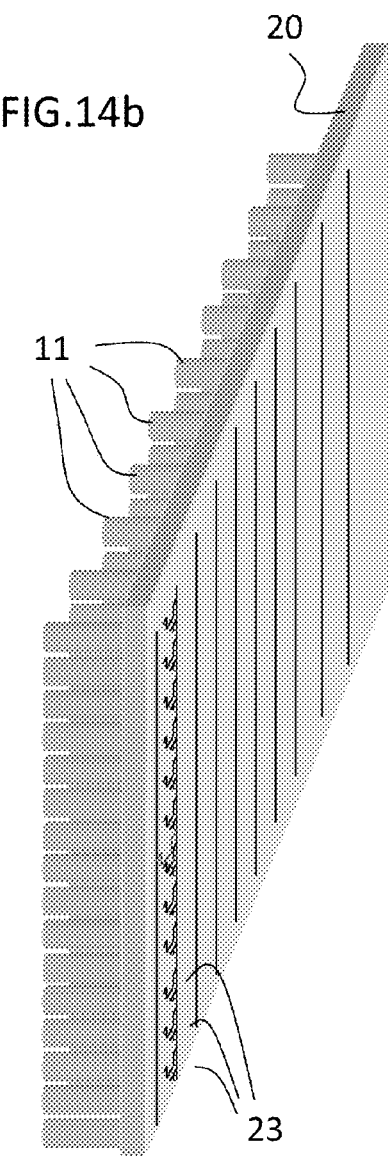

FIGS. 14a and 14b show a third variant, which is similar to that of FIGS. 10a and 10b, in which the electronic functions are grouped on a single electronic card 20, on which the cells are disposed so that their axis is perpendicular to the electronic card 20, with only local processing at the level of each module, with no connection to a central computer. FIG. 14a is a plan view, showing the distribution of the modules 12 on the card 20, and FIG. 14b is a perspective view from the rear, enabling different cells 11 to be distinguished, as well as certain electronic components such as cell transistors 23, sketched in a non-exhaustive manner to simplify the representation of the electronic card 20. However, the latter card comprises all the components described with reference to FIG. 13.

Note that in the final analysis it is possible to produce embodiments with different numbers of electronic cards 20, a card being able to carry the electronic circuits of the invention for one, two or any number of modules. Moreover, it is also possible to provide other embodiments in which only some of the electronic components previously described are present, on an electronic card or not, or in which some components are shared between cells and/or modules. For example, a switch control circuit can be shared by a plurality of adjacent modules, so as to preserve an acceptable voltage supply.

In all cases, the electronic cards 20 are advantageously disposed so as to dispose their terminals connected to the cells 11 nearest the terminals of the cells so as to minimize the length of the connections and therefore the associated losses. Likewise, on the printed circuit of the electronic card, the power tracks are as short as possible with the highest possible conductor section.

Figure 15:
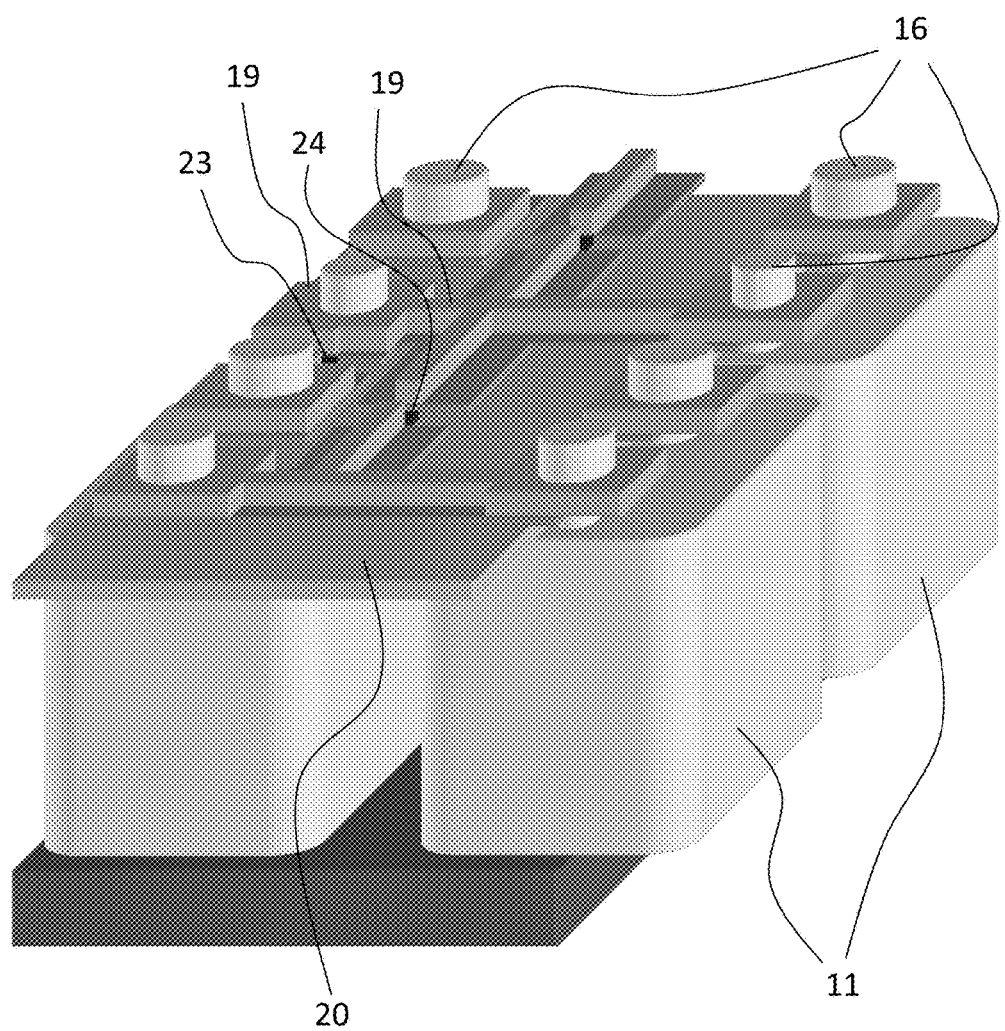
FIG. 15 shows a variant of an electronic card of this embodiment of the invention.

To increase the conductor section, it is possible to reinforce the tracks of the printed circuit by soldering a conductive wire or rod on top of them. FIG. 15 shows such a solution, in which an electronic card 20 of printed circuit type is superposed on a module comprising a plurality of cells 11. In this figure, only two modules of two cells are represented, to clarify the figure, but the battery comprises more than two modules each having more than two cells. Note that such reinforcement can implement the second function of evacuation of the heat generated, notably that dissipated by the power transistors; for this purpose, its shape may also have a surface promoting this function, in the manner of a convector or radiator. Connectors 16 are provided on this card in order to connect the cells electrically to the electronics on the card, for example cells with positive and negative terminals that pass through the card and clamp the card and the reinforced power tracks via a nut that screws onto the terminals of the cell. A relatively elastic washer can be added between the card and the nut to compensate thermal expansion effects and to ensure a good electrical contact in the long term. Alternatively, a simple soldered joint can make the electrical contact between the terminals of the cell and the power tracks of the PCB. As can be seen in the figure, electrically conductive reinforcements 19 are added to the tracks of the printed circuit. These reinforcements welded and/or stuck to the tracks also represent a potential thermal radiator function. Additionally, holes, not shown, may be made through the electronic card 20 to facilitate the circulation of air and the cooling of the cells 11 and the electronic components.

FIG. 16 shows the internal structure of a lithium-ion type cell routinely used in the prior art. Such a cell has a cylindrical shape, as described above, and comprises a multitude of positive electrodes 51 and negative electrodes 52, taking the form of interleaved wound layers with the same axis, separated by electrolyte layers 53. An external first face forms the positive terminal 54 or first current collector of the battery and a second external face forms the negative terminal 55 or second current collector.

FIG. 17 shows a lithium-ion type cell in accordance with a second embodiment of the invention, in which additional functions are integrated into the very core of the structure of the cell. Accordingly, the energy storage cell 50 of the invention comprises the same components as the prior art battery represented in FIG. 16. To facilitate the integration of components into the battery 50, an interior positive terminal 54' is added, connected directly to the active energy storage part of the elementary battery. The battery therefore comprises a cell switch 63, in the form of a transistor, disposed in series with the active part of the battery and a second transistor 64 disposed in parallel with the battery, i.e. in parallel with the active part in series with the cell transistor 63. It further comprises a device for controlling these switches, a microcontroller 60 with an input interface 61 and a control circuit 67 which receives instructions from the microcontroller and transmits open and/or close commands to the switches. Finally, the battery incorporates a temperature sensor 62, one or more voltage sensors 65 and a current sensor 66. All these components are therefore mounted in a upper part of the cell, between the interior positive terminal 54' mentioned above and an external positive terminal 54. These components could naturally instead be arranged differently, inside the exterior casing 68 of the cell 50, or the cell could integrate only part of these components. For example, the cell could be rectangular, like a flat battery for a mobile telephone. Moreover, the polarity of the terminals of the active part could be inverted, together with that of the cell (the series transistor would be placed beside the − terminal instead of the + terminal). On the other hand, these components are powered directly by the active part of the cell.

Figure 18:
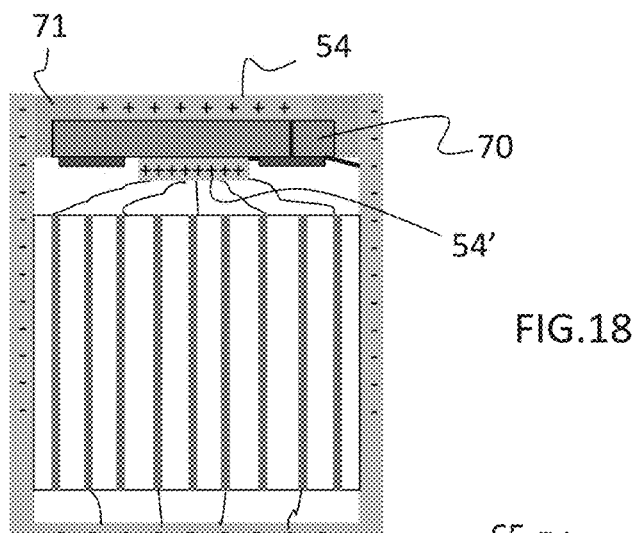
FIGS. 18 to 20 show a variant of the second embodiment of the invention.
Figure 19:
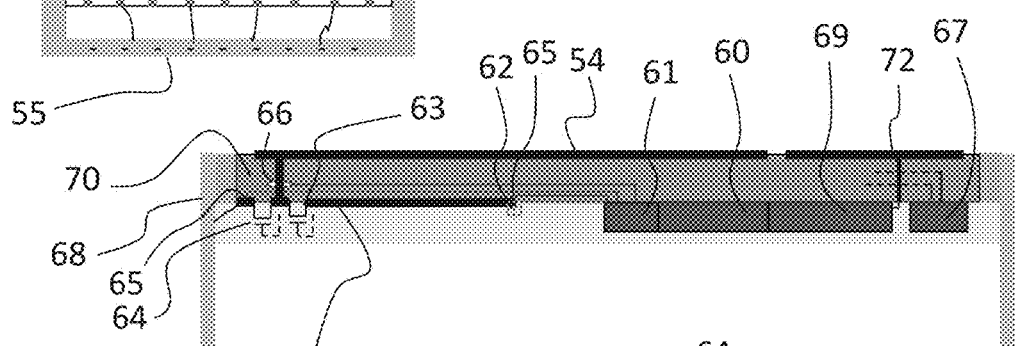
Figure 20:
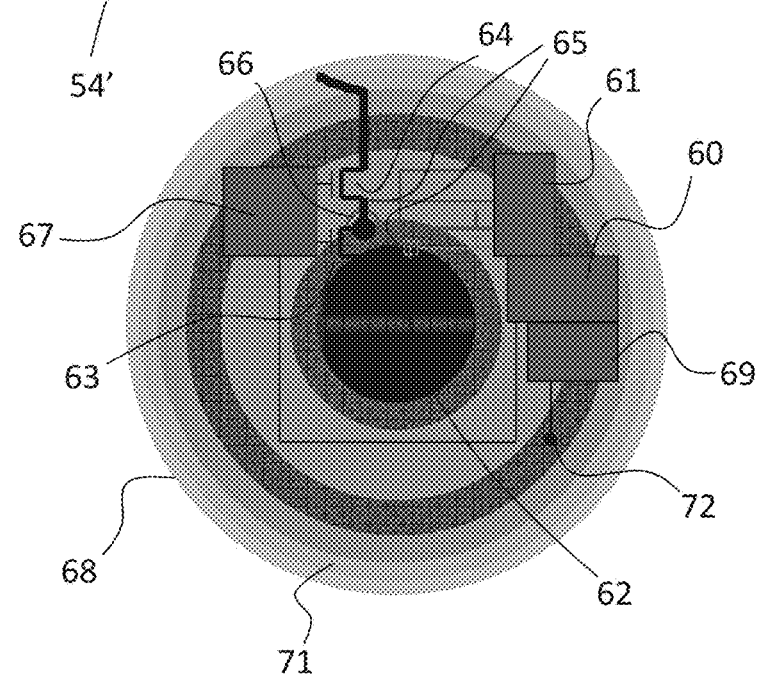

FIGS. 18 to 20 show a variant of the previous embodiment in which the various components in the cell 50 are positioned on an electronic card 70 of the printed circuit type, in order to reduce the number of wires necessary and to facilitate mass production of such a cell. FIG. 18 shows one such embodiment in which an electronic card 70 is located between the two positive terminals 54', 54 of the cell and connected directly to those two terminals. The lateral part of the electronic card is covered by a sealing layer 71, for example comprising an adhesive, which makes it possible to separate the two terminals 54, 55 of the cell at the same time as protecting and fixing the electronic card in a sealed manner. Moreover, the components positioned on the electronic card 70 are powered directly by the active part of the cell and protected by a varnish type insulating protective layer.

FIGS. 19 and 20 show in detail one embodiment of the electronic card 70. It comprises a lower connection with the interior positive terminal 54' of the cell. The card integrates on its lower surface the following components: a control circuit 67, which drives the power transistors using low-power and low-voltage signals from a microcontroller 60 or logic circuits. In this embodiment, the microcontroller 60 is connected via an analogue-to-digital converter (ADC) and an input interface 61 to various sensors, namely a temperature sensor 62, two voltage sensors 65, for measuring the respective voltages at the interior positive terminal 54' and the exterior positive terminal 54, and a current sensor 66. The electronic card 70 further integrates a cell transistor 63 connected in series and a second transistor 64 connected in parallel. Moreover, in this variant, the microcontroller 60 is provided with a communication interface 69 connected by a channel passing through the exterior casing 68 of the cell to a communication terminal 72 accessible from outside the cell. This communication terminal 72 enables communication with the cells in parallel of the same module or with an external control system. In such a case, galvanic isolation of the communication facility may be provided.

In all cases of using an electronic card integrated into a cell, it is possible to use a plurality of transistors in parallel to implement the switch function, in order to reduce the overall resistance in the closed state obtained with a single transistor, to cause a higher current to circulate or to distribute the heating effect at a plurality of points on the electronic card 70 to facilitate the evacuation of heat.

Accordingly, in the context of a second embodiment of the invention, the first embodiment of the invention and its variants may be modified using cells that incorporate directly within their casing the functions described above, which avoids the necessity for the independent electronic cards 20 described in connection with the first embodiment of the invention. In the second embodiment the card is adapted to the cell, but not to the organization of the cell in the battery, in contrast to the first embodiment in which the card 20 must be adapted to the physical organization of the cells in the battery, which may vary from one application to another.

The battery structure so described is of modular type, and enables physical implementation in the form of different independent and removable casings that may be connected to one another via a communication bus and a power bus in an appropriate rack or frame. Each casing may comprise any sub-part of the battery, from one module to a plurality of modules.

Figure 21:
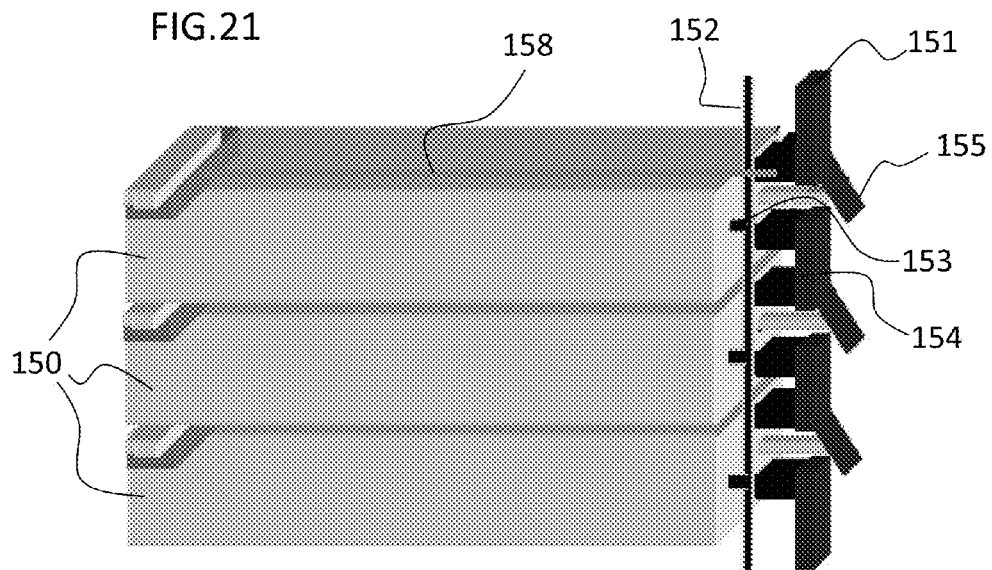
FIG. 21 shows one embodiment of a rack incorporating a battery in accordance with the invention.

FIG. 21 shows an approach of this kind in which the various casings 150 are disposed in a rack type modular architecture. Each casing is fixed in the form of an independent shelf and retained by a locking/unlocking device. In their fixed position, the casings are connected to a communication bus 152 via a connector 153 with high galvanic isolation and to a power bus 151 by a power connector 154 enabling a serial connection to the adjacent casings. The locking/unlocking device 158 is associated with a switch system for automatically cutting the connections to the communication bus and the power bus when it is actuated to remove a casing 150. When the casing is removed the connection is replaced by a short circuit, for example via the mechanical or electrical switch 155, so as not to break the connection between the remaining casings. To this end, the start of locking or unlocking by actuation of a lever or handle of the locking/unlocking device is detected and information is transmitted to the overall battery management system, such as a central computer. In the event of unlocking a casing, the computer immediately isolates it from the overall operation of the battery and imposes a zero voltage at its terminals, which ensures safe manipulation and enables safe storage. The connections to the power and communication buses are then mechanically or electrically cut automatically by a switch. The preceding operations are effected in reverse order in the case of inserting a casing into the rack.

Accordingly, the battery comprises a plurality of casings disposed in series and a rack with slots for accommodating the casings in a removable manner, a slot comprising electrical contacts for the electrical connection of a casing with the terminals of the battery, via a power bus, the location being associated with a rack switch, so as to be able to preserve electrical power output in the absence of a certain casing in a certain slot via at least one other casing disposed in another slot in the rack.

This construction has the advantage of simplifying physical management of the battery. Each subassembly in each casing is managed independently or semi-independently thanks to the architecture of the embodiments described above. It is therefore possible to know precisely the state of charge, the state of health and aging, deterioration, the current and voltage capacity of each casing, and to be able to intervene on a given casing in the event of a fault to change a module or even a cell or to be able to change it if necessary without compromising the battery as a whole.

Figure 22:
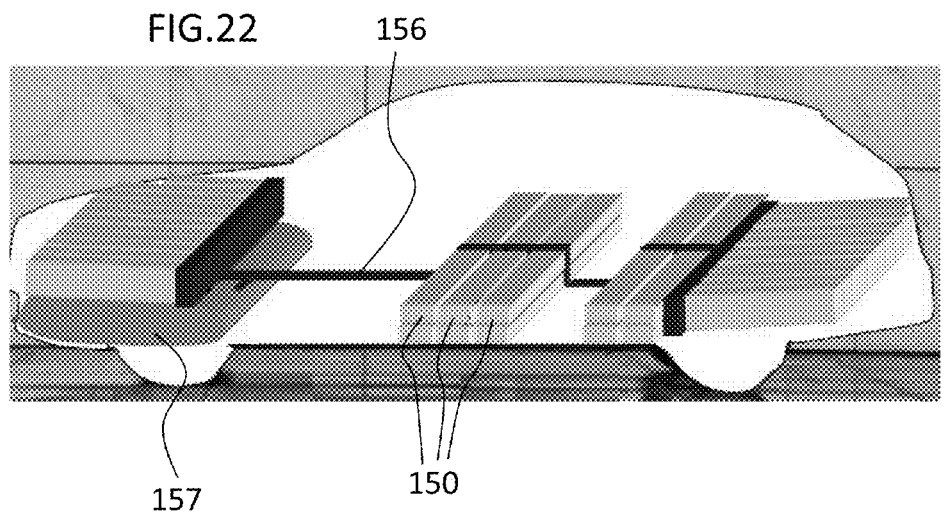
FIG. 22 shows the above rack integrated into an motor vehicle in accordance with one embodiment of the invention.

This physical assembly can therefore be integrated into an motor vehicle as shown in FIG. 22, in which the various casings are distributed in the lower part of the motor vehicle, over all of its length, and connected to each other by a connection 156 including a power bus 151 and a communication bus 152, this system being connected to a central computer 157.

The invention also relates to a method of managing a battery as described above. This method includes a step of electrically powering a control circuit of a cell switch from at least one cell of the battery.

The battery management method may further comprise the step of electrically powering all the other internal components of the battery necessitating a power supply from at least one cell of the battery.

The battery management method may comprise the following additional steps:
measuring at the level of a cell of the battery at least one parameter representative of the state of the cell;
determination of the open or closed position of a cell switch and/or module switch and/or parallel switch taking into account the measured parameter;
commanding opening or closing of a cell switch and/or a module switch and/or a parallel switch as a function of the open or closed position so determined.

The battery management method therefore makes it possible to determine at any time the open or closed position of a plurality of cell and/or module switches so as to balance each of the modules of the battery and to route the current in each module to balance each of the cells of the module. The method may notably comprise an intermediate step consisting in diagnosing a fault and/or a level of risk of a cell, recognizing defective cells, overheated cells, etc., on the basis of the parameter measured at the level of a cell, in order to disconnect the cells concerned or to isolate them from the overall operation of the battery, for example by opening their cell switch and/or closing the module switch concerned.

Accordingly, returning to the example shown in FIG. 5, it is apparent that the cells 1, 2, 5 and 6 have been isolated. In a battery comprising a large number of cells and modules, it is easy to isolate a significant number of them, for example 10% of the total number of cells, without compromising the use of the battery because the current demand is generally less than the maximum available current, used only in a consumption peak situation. Moreover, in the event of a consumption spike, it will always be possible to call on the isolated cells temporarily to meet the increased demand. As these cells will remain unused most of the time, they will not endanger the overall state of health of the battery.

The battery management method therefore comprises a step of diagnosing a cell including a step of estimating the state of a cell, which may comprise by way of nonlimiting example one or more measurements of current, voltage, temperature, impedance spectrometry measurements, etc. at the level of at least one cell, all or some of the cells of the battery. To this end, the parameter measured can be compared to predefined thresholds. The control of each cell transistor then depends on this estimated state of the cell and for example makes it possible to disconnect a cell if it is showing an abnormal current or temperature or if it is supplying a current in the opposite direction to the other cells, as in a situation of adjoining cells that are discharging through a faulty cell.

The step of diagnosing a cell notably comprises a step of estimating the state of charge and the state of health of the cell. Likewise, the control of each cell transistor depends on these estimates. There may notably be established a comparison of the estimated state of charge of the cell with a discharge threshold and/or a charge threshold.

The step of diagnosing a cell comprises measurement of a cell complex electrical impedance, for example. To this end, the current and the voltage are measured at the level of the cell when current is flowing in a cell, for example at the time of a particular command to the series switch associated with the cell, such as opening or closing it. The response to white noise, a step change or a pulse enables the complex impedance measurement, in known manner, from which it is possible to deduce information on the state of charge or the state of health of the cell.

The step of diagnosing a cell in accordance with one embodiment of the invention also comprises measuring the current in a cell by means of a current transformer. The idea is to increase the frequency of the current to facilitate the measurement, notably in the case of a direct current, without using direct current sensors. To increase this frequency, a first solution consists in alternating the cells used at the level of the modules and alternating the modules used to generate the output voltage of the battery. A second solution consists in rapidly connecting and disconnecting the cell at the moment its current is measured. These solutions finally employ chopping of current at the level of a cell, which makes it possible to give preference to measuring this current. It is then sufficient to use as a current sensor a simple current transformer, which may be positioned on the electronic card carrying the various electronic components mentioned in describing the embodiments shown.

The step of diagnosing a cell also comprises estimating the state of charge of the cell. To this end, a first solution relies on measuring the output voltage of the cell. Another solution consists in integrating the current from the discharged state to determine the number of ampere-hours stored and then the state of charge by its ratio with the capacity of the cell. This latter solution necessitates regular calibration by complete charging and discharging operations to compensate the drift linked to integration of the current and to update the capacity of the cell as it ages. This calibration can be carried out on one or more cells while the others are operating normally, which has the advantage of not necessitating completely shutting down the battery. To preserve the balance of the battery, all the cells are subjected to substantially the same number of calibrations.

Moreover, the battery management method may employ cyclic modification of the use of the cells, so that all or some of the cells of the battery go from a state of normal operation to a disconnected state and vice-versa in accordance with a particular cyclic ratio that may be fixed or variable. This cyclic ratio makes it possible to fix the proportion of the time of use of each cell of the battery so that, for example, the proportion of the time of use of faulty or overheated cells is lower than that of cells that are not overheated. Such a cycle can be used for some or all of the cells, even for healthy cells, as a function of the total current and voltage demand. The operating cycles of the various cells may be offset in time to obtain at any time a substantially equivalent number of cells that are active, for example, guaranteeing at any time a sufficient number of active cells to satisfy the current demand.

Accordingly, the battery management method employs the following steps:
  balancing the modules and/or cells with each other, giving priority to using the modules and/or cells with the highest charge when the battery is connected to a load and the modules and/or cells with the lowest charge when charging the battery;
  balancing the modules and/or cells by modifying the average rate of use of the modules and/or cells but without using the same modules and/or cells all the time, so that the charge of the modules and/or cells is balanced; in fact, if one module is very highly charged compared to the other modules, for example, and is used at all times, so that its charge reaches the charge of the other modules as quickly as possible, there is a risk of it overheating; balancing is preferably carried out continuously during charging or use of the battery and it is therefore not necessary to charge a module strongly to arrive rapidly at equilibrium; by simply modifying the average rate of use of such a module by a few percent compared to the other modules, balancing of the charge of the modules can be achieved without excessive imbalance of the stress on and heating of the modules of the battery pack; this balancing is applied in the same manner for the cells of the same module or not;
  choosing the modules as a function of the current that they can supply and calling on them when they are able to supply a current greater than or equal to the current demand; modules with a lower capacity to supply the current are used during phases in which the current demand is lower;
  limiting use or making preferential use of the modules and/or cells with the highest temperature if the current demand is lower; the temperature of a module and/or cell exceeding a threshold is generally avoided; this risk of exceeding a threshold is anticipated. The optimum is for the temperature in the battery to be kept relatively homogeneous to homogenize aging of the cells and enhance their durability.

Alternatively, other strategies can be imagined and the battery management method may comprise the following steps, for example:
  priority use of part of the battery so as to have to change only this part of the battery when the first change is necessary; it is conceivable that part of the battery could be more easily interchangeable;
  greater use of cells optimized to resist intensive use and limited loading of the rest of the battery, which can be optimized instead to provide energy capacity; more generically, in the case of a battery using heterogeneous cell technologies, i.e. combining cells of different kinds, heterogeneous use may be beneficial to optimize overall performance by taking into account the advantages of each cell.

Note that the battery management method employs a step of chopping the charging and/or discharging current of one or more cells, with the aim of slowing down its aging. This chopping is easily achievable by connecting and disconnecting the cells in accordance with a certain cyclic ratio or by alternating the activation of the modules, at the same time as ensuring the correct voltage level at the output of the battery. Chopping the current makes it possible to achieve higher "peak" currents, which is reflected in a cell by a maximum voltage higher than the normal voltage, which encourages the migration of ions in the cell and reduces its loss of storage capacity.

Moreover, it is possible for the battery management method to implement the following steps:
  closing the module transistor after a short time-delay following the module voltage crossing a high threshold (this threshold corresponding to the maximum voltage that can be achieved at the module level when charging with the cells connected plus a safety margin: this is a way of detecting that all the cells are disconnected while a charging current is passing through the battery), re-opening the module transistor in the event of a discharge current appearing that passes through the module transistor; this current is also detected in the other cells of the module: accordingly, the current sensor may be placed on the power path common to the cell and module transistors; if the cell is not faulty or undercharged, then closing the cell transistor;

closing the module transistor after a short time-delay following the module voltage crossing a low threshold (this threshold corresponding to the minimum voltage achievable at the level of the module when discharging with the cells connected less a safety margin) to detect that all the cells are disconnected while a discharge current is flowing through the battery, re-opening the module transistor if a charging current appears at the level of the module transistor, also detected at the level of the cells of the module, closing the cell transistor for cells that are not faulty or overcharged when the voltage of the module tends to rise toward the voltage of the cell; ensuring that the voltage of the module rises ensures that no module transistor at the level of the module remains closed;

closing the module transistor after a short time-delay after the voltage of the module crosses a low threshold, re-opening the module transistor after a short time-delay if a discharge current below a threshold appears and if, just before closing the module transistor, the cell transistor has been opened because of too high a discharge current, then closing the cell transistor (closing the cell transistor must generate a reduction of the current or even reversing of the current in the module transistors that would have remained closed in the cells in parallel, which should accelerate their opening); if module transistors remained closed, this would generate an overcurrent in the cell transistors, which should lead to them re-opening;

opening the cell transistor if the cell tends to be overcharged, for example either by a voltage above a certain threshold or by a maximum number of ampere-hours stored that exceeds a certain threshold, in which case the cell transistor is closed again if a discharge current exists and the corresponding module transistor is open; if the latter transistor is closed, the operations described above are applied;

opening the cell transistor if the cell tends to be undercharged, for example by a voltage less than a certain threshold or by a number of ampere-hours below a certain threshold; the cell transistor is closed again if a charging current exists and the corresponding module transistor is open; if the latter transistor is closed, the operations described above are applied;

opening the cell transistor if the cell becomes overheated, followed by cyclic repetition of an operation of opening and closing the cell transistor for as long as the corresponding module transistor is open, to limit the temperature of the cell to an acceptable level; if the temperature of the cell reaches a value that is too high, the cell transistor remains open; when the temperature has fallen below a predefined acceptable threshold, the transistor is closed again if the corresponding module transistor has remained open; if the temperature then rises very rapidly, in an excessive and abnormal manner, the cell is considered faulty and its cell transistor is then held open;

opening the cell transistor if the current in the cell exceeds a maximum threshold, which threshold can be different for operation in a cell charging and discharging phase, followed by re-closing the cell transistor if the voltage of the stage approaches that of the cell and of course if the module transistor has remained open, which means that closing this transistor will not generate an low current that would necessitate its immediate re-opening;

if the cell is diagnosed as faulty, its associated cell transistor will naturally remain open until the cell is replaced.

Finally, the battery diagnosis method more generally comprises a step of measuring at least one parameter characteristic of the state of a cell, e.g. a voltage, a current, a temperature, a number of amperes per hour, or even any other meaningful parameter, followed by a step of deciding on the states of the cell switch and/or the associated module switch taking account of this measurement. As explained above, this decision may lead to an action consisting in total opening of the cell switch or closing of the associated module switch if the cell is faulty, to disconnect it from the rest of the battery, or to an intermediate step of alternate opening and/or closing in accordance with an optimum cyclic ratio to maintain the cell in an acceptable state. In one embodiment, a plurality of thresholds can therefore be predefined for a certain measured parameter in order to determine different actions according to the threshold reached. The actions undertaken following measurement of a parameter linked to a given cell are determined so as to minimize switch opening and closing operations, to avoid excessively frequent switching, which is power hungry, to avoid untimely switching, and to control the synchronization of switching of the switches between the various cells of the battery.

The battery management method described above may be implemented by a local and/or remote computer, as explained above. This computer may comprise one or more microprocessors.

Note that local implementation of the method, without recourse to a central computer, has the following advantages:

as the measurement(s) and the analysis thereof are carried out locally and independently of the other modules, the reaction can be very fast; it is faster than in the embodiment with a central computer which would necessitate communication via a connection with galvanic isolation, firstly with serial coding that would induce a first time-delay, followed by transfer over a bus at a low bit rate which would involve a second time-delay;

if a module comprises its own computer, intensive processing of the measurements can be carried out so as to achieve an accurate diagnosis of each cell, its state of health and its state of charge.

The battery management method may comprise the following specific steps if the management of a cell is entirely local:

as soon as the number of faulty cells in the same stage reaches a threshold, opening of all the cells and activation of a shunt potentially placed in each of the cells are commanded so as to take the stage out of service;

if a cell is faulty, for example if there is a leakage of current or overheating, when it is excessively discharged (which is detected by the voltage falling below a voltage threshold, for example) or overcharged (which is detected by the voltage exceeding a voltage threshold or an acceptable number of ampere-hours, for example), it is disconnected by opening its series transistor;

if a cell becomes heated, it can be connected/disconnected in accordance with a cyclic ratio so as to limit its rise in temperature; this objective can be achieved by controlling the cyclic ratio as a function of the temperature measured at the level of the cell;

if a disconnected cell sees the voltage of the stage fall sufficiently below 0 V (by a few times −100 mV, for example), then it closes its parallel transistor (there is no risk of short circuiting the cells in parallel since the voltage passes through zero of its own accord: typically when all the cells of the same stage are disconnected and current is drawn from the battery pack); a short time-delay may be provided between detection of the voltage falling below the threshold and commanding the parallel transistor so that the adjacent cells also have time to detect crossing the threshold;

during application of a charging current to the battery pack, if a disconnected cells sees the external voltage rise above the maximum voltage that a cell can reach during charging, then it closes its parallel transistor (there is no risk of short circuiting the cells in parallel because for the voltage to be able to go beyond this threshold all the cells of the stage must be open);

if a cell sees a current that is too high, which can notably happen if there are no longer enough cells in parallel to meet the current demand or accept the incoming current, then the series transistor of the cell is opened, which eliminates the risk of deterioration of the cell; if after such disconnection the active cells remaining in parallel see too high a current, they will also disconnect of their own accord;

when all the cells of a stage are disconnected and current is being taken from the battery, then the voltage at the level of the stage will drop and tend to become negative: at this time, each of the cells will activate its parallel transistor which will take over for the purpose of circulation of the current in the battery;

when all the cells of a stage are disconnected and a charging current is applied to the battery, then the voltage of the stage will rise and exceed the maximum charging voltage of a cell: in this case, the cells will trigger closing of their parallel transistor;

to be certain that all the cells have detected that the voltage threshold has been exceeded, a short time-delay may intentionally be applied to commanding the parallel switch at the level of each cell to allow the voltage to progress before reducing it to zero by this closure;

if a cell has been disconnected following excessive discharging (the voltage falling below a voltage threshold), it may decide to reactivate itself as soon as the voltage of the stage rises above that of the cell (in the situation where the parallel switch has not been activated); if the parallel switch had been activated, then the decision to deactivate it may be based on detection of a current in the shunt that is in the direction of a charging current; opening the parallel switch must then allow the voltage to rise unless the cell or cells in parallel keep their parallel switch closed for some other reason; if the voltage fails to rise at the end of a certain time then the parallel switch is reactivated to prevent the parallel switches of the cells in parallel taking the whole of the current for too long; if on the other hand the voltage rises to the voltage of the cell or beyond, then the series cell switch is activated and the cell is charged;

if a cell is disconnected following overcharging (passage of the voltage above a voltage threshold), it may decide to reactivate itself as soon as the voltage of the stage falls below that of the cell (in the situation where the parallel switch has not been activated); if the parallel switch had been activated then the decision to deactivate it may be based on detection of a current in the parallel shunt circuit that is in the direction of a discharge current; opening the parallel switch is then followed by closing the cell switch, and a short time-delay between opening the parallel switch and activating the series cell switch may be provided in order to allow time for all the cells to detect the discharge current;

if a cell has disconnected following too high a current and the parallel switch has not been activated, this means that the cells in parallel have been able to withstand the current and maintain the voltage, the cell may then attempt to reconnect as soon as the voltage of the stage is sufficiently close to the voltage of the cell;

if a cell has disconnected following too high a current and the parallel switch has been activated, it is probable that the adjacent cells were overcharged or excessively discharged and are no longer contributing to the storage of the current; in this case, as soon as the current that flows in the parallel switch becomes of the opposite sign to the current that caused the activation of the cell (and supposedly of the adjacent cells), then it is opened; if a charging current is present then the cell switch is activated as soon as the voltage approaches the voltage of the cell, and if the voltage fails to rise at the end of a certain time the parallel switch is reactivated (it is assumed that a cell in parallel has not reopened is parallel switch and too high a current cannot be allowed in it for too long); if a discharge current is present and the voltage of the stage begins to fall (i.e. as soon as it is certain that the parallel switch of all the cells in parallel is open, otherwise the voltage would not have been able to fall) then the series switch is closed, a short time-delay between opening the parallel switch (followed by detection of the voltage drop) and activating the cell switch may be provided in order to leave time for all the cells to detect the discharge current and then the voltage drop;

if a cell has disconnected following a fault that cannot be remedied, then the cell switch is never reactivated; on the other hand, the parallel switch that must close in some cases must also be able to open; if the parallel switch has been activated following detection of the voltage of the stage crossing a value less than a threshold (a few times −100 mV) then the latter switch may be re-opened if the current through it is a charging current; if it was activated following detection of the voltage of the stage crossing a value above a threshold (maximum voltage that a cell can reach during charging), then it may be re-opened if the current through it is a discharge current; it is in fact assumed that whatever caused the general closing of the parallel switches results from the fact that the cells in parallel have reached full charge or discharge or an excess current and that if an opposite current were to appear in the battery, then the cells in parallel will be reactivated; if the adjacent cells in parallel are never reconnected, then the voltage of the stage will be re-established, either above the normal maximum voltage or below the normal minimum voltage, and again trigger the parallel switches of the cells of the stage;

if a cell has disconnected following a fault that can be remedied, then the cell can be reconnected when the fault has cleared (for example when the temperature has fallen sufficiently or the cell has been replaced); if the parallel switch was activated, then the same process is followed as in the previous paragraph.

The above principles may be applied in a similar manner for centralized management.

All these operations of the method of managing a battery are effected on the basis of an analysis by one or more microcontrollers. Alternatively, as the actions to be effected are simple, to limit the energy consumption of the solution it is possible to use all or part of an asynchronous electronic circuit, with no necessity for a high-frequency clock. In such a variant, the detection of a threshold would be effected directly from an analogue measurement via a comparator and the action induced following a threshold crossing could be executed asynchronously via logic circuits using flip-flops, registers, for example.

Figure 23:
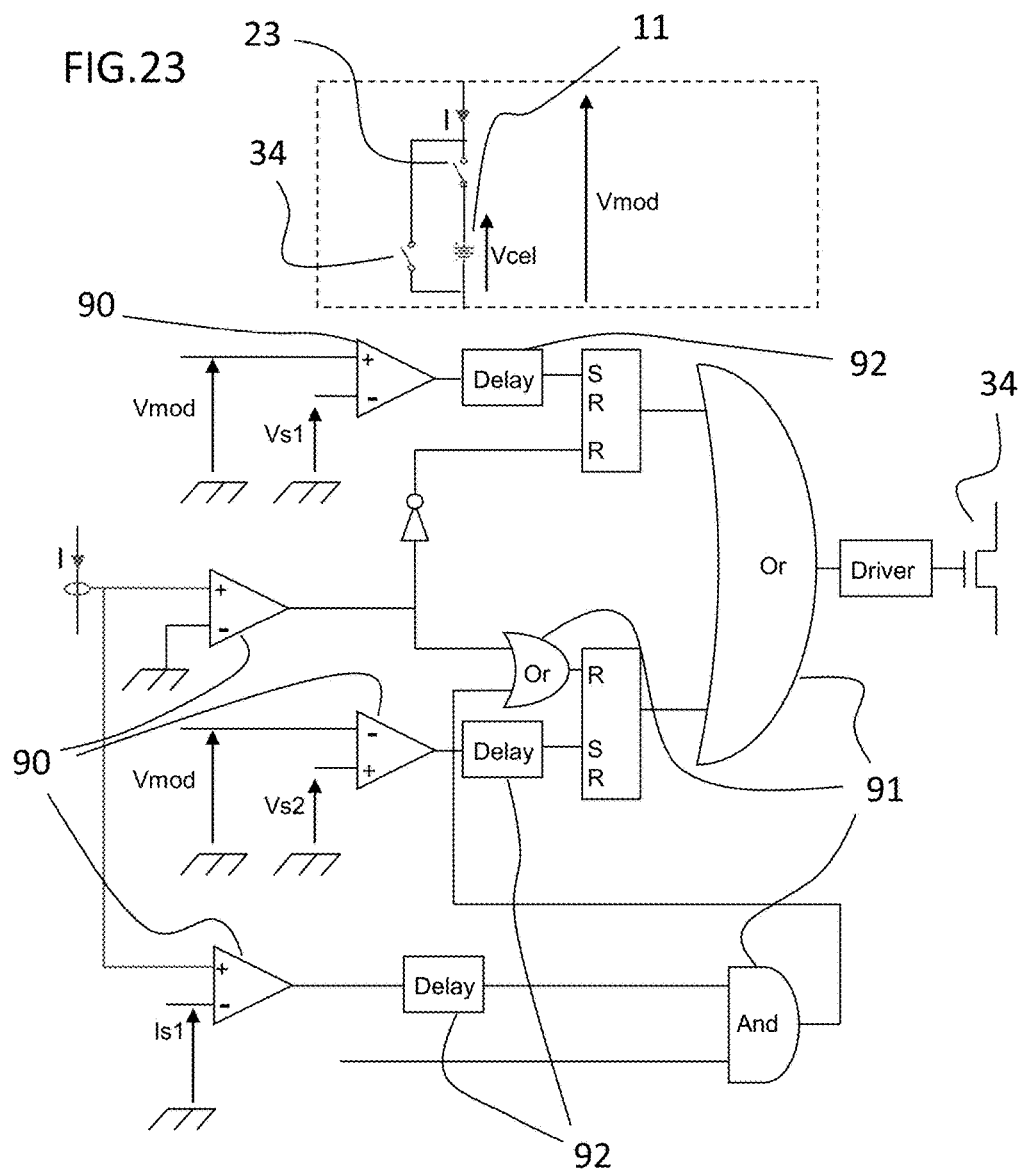
FIG. 23 shows the principle of controlling a parallel transistor in accordance with one embodiment of the invention.

FIG. 23 shows one possible embodiment in accordance with such an approach enabling control of a parallel transistor 34. In this embodiment, sensors, not shown, are used to measure the voltage Vmod of a module, the voltage Vcel at the terminals of a cell and the current I flowing through a cell. These measured values are compared to three threshold values, high and low threshold values Vs1 and Vs2 for the voltage of the module and a threshold value Is1 for the current. Four operational amplifiers (or comparators) 90 are used to compare these measured values with these thresholds, in order to arrive at a final decision to open the module transistor 34 or not, with the aid of a plurality of logic operators 91 and delay cells 92. The "Delay" cells 92 of this circuit may, in addition to their function of delaying the reaction to a given event, ensure that the result of the comparison is stable over a certain time period and take account of a transition only if the stability of the result of the comparison has been repeated over a predefined time period, in order to eliminate garbled measurements, for example because of noise caused by the switching of adjacent cells or modules.

One advantage of this way of controlling a module transistor is a result of the fact that there is no need to digitize the measured signals and the reaction can be very fast, without this necessitating very high frequency sampling of the signals. Moreover, all the operations may be carried out in parallel, which is highly beneficial if all the cells are required be able to react synchronously, opening or closing a transistor on the basis of the voltage of the stage common to all the cells of the stage, and not on a clock front that would not be common to each cell of the stage because the same clock could not be shared without an additional output to the cells. Such synchronization can thus make it possible to reduce or even eliminate the risks of overlapping between the closing of the cell transistors 23 and the parallel transistors 34.

Moreover, the battery management method also uses an additional step of disconnecting all possible cells if the battery is not to be used for a long time. This step affords considerable safety, notably in particular situations such as after an accident or a fire. If a large number of cells are disconnected, and preferably all the cells, the risk of a major short circuit between the cells remains very low, even in the event of a serious incident. Moreover, isolating cells when stopped prevents the cells discharging via certain cells that have the highest leakage current or are faulty.

In accordance with one advantageous embodiment, the control method of the invention includes commanding cell and/or module switches to obtain an output voltage of predefined value and/or an alternating output voltage in accordance with a predefined setpoint. In a similar manner, the control method of the invention includes controlling cell and/or module switches during a charging phase so as to obtain a predefined charging voltage and/or current in each cell to be charged.

Accordingly, the battery management method also enables adaptation of the output voltage in accordance with the required use, for example the requirements of an electrical load. This adaptation includes, for example, the restricted choice of a certain number of modules to be used in series, the other modules remaining unused, when the total voltage necessary is less than the maximum voltage that the battery can deliver. In making this choice, it is possible to set aside the most discharged modules in favour of the most charged modules and/or to leave faulty modules unused, as explained above. Additionally, the method may also be operative at the level of the cells themselves, and produce the required voltage by disconnecting certain selected cells of certain selected modules, for example giving preference to using the most highly charged cells.

Figure 24:
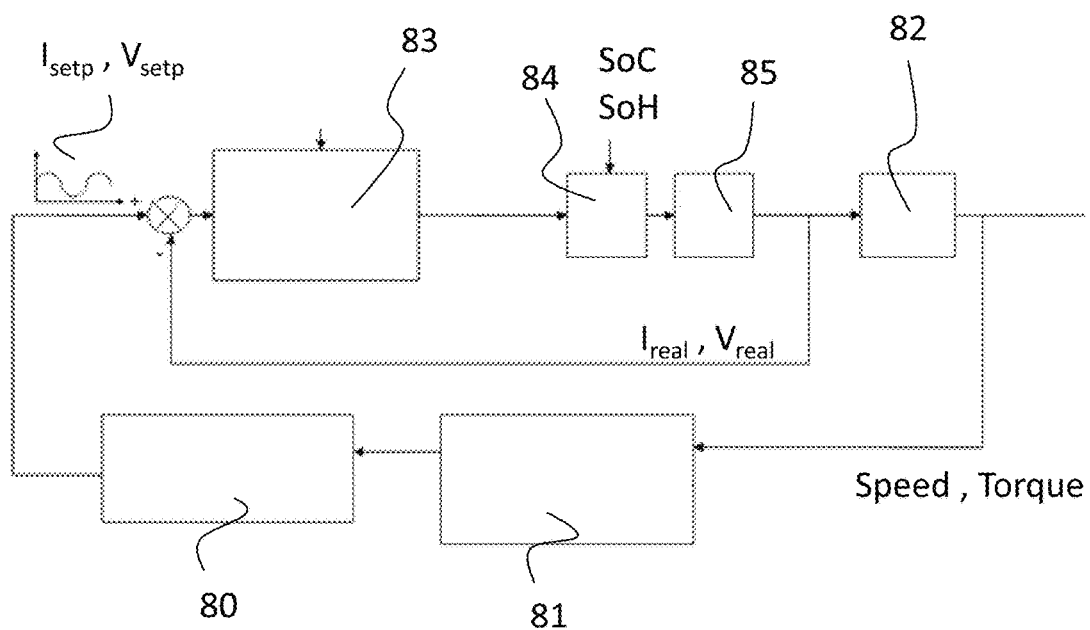
FIG. 24 shows one embodiment of a control system of the battery in accordance with the invention.

The adaptation of the output voltage of the battery of the invention may even take complex forms. In fact, the invention is able to supply a sinusoidal output voltage for a synchronous or asynchronous motor of a motor vehicle. FIG. 24 shows one example of battery regulation to obtain such an output voltage, for example implemented within the central computer 22 of the FIG. 11 embodiment. This regulation is based on a unit 80 for calculating a setpoint value of the electrical parameters required at the battery output, comprising the setpoint voltage $V_{setp}$ and the setpoint current $I_{setp}$, as a function of taking into account any demand of a driver of the motor vehicle in a unit 81, notably transmitted via the accelerator pedal, and as a function of the operating values of the motor of the motor vehicle, like the speed (Speed) and the torque (Torque), transmitted by a unit 82. Note that the setpoint may consist in a combination of these values of current and voltage, for example their product $I_{setp} \times V_{setp}$. The unit 80 for determining at least one setpoint value may rely on vector control, taking into account the adjustment of the amplitude, frequency and where applicable phase of the current/voltage parameter according to the type of motor to be powered. This principle is naturally also operative in simpler situations, such as a requirement for a DC voltage. The regulation unit then comprises a correction unit 83 using the difference between the setpoint values $I_{setp}$, $V_{setp}$ and the corresponding real values $I_{real}$, $V_{real}$, which transmits a requirement to a unit 84 which determines the number of battery modules necessary and where appropriate the particular cells in those modules to be used. In accordance with a preferred embodiment, the choice of the cells to be used in the modules is effected at the level of the modules on the basis of parameters measured locally. To this end, this unit 84 also receives information produced by measuring parameters at the levels of the modules and the cells of the battery, and notably the state of charge SoC and the state of health SoH of the cells or modules. Finally, a final unit 85 implements the choice determined by the unit 84 and notably sends the necessary commands to the various switches of the battery. This results in the real output values of the current $I_{réel}$ and the voltage $V_{réel}$ that are received by the motor of the motor vehicle, which makes it possible to achieve operating values such as a speed (Speed) and a torque (Torque) transmitted by the unit 82. Finally, a variation frequency limiter and/or a low-pass filter may be applied in the correction unit 83 or to the return loop to obtain an appropriate mean value, limiting the cell switching frequencies, for example in accordance with a frequency of 200 kHz for an output voltage frequency of 500 Hz.

Figure 1:
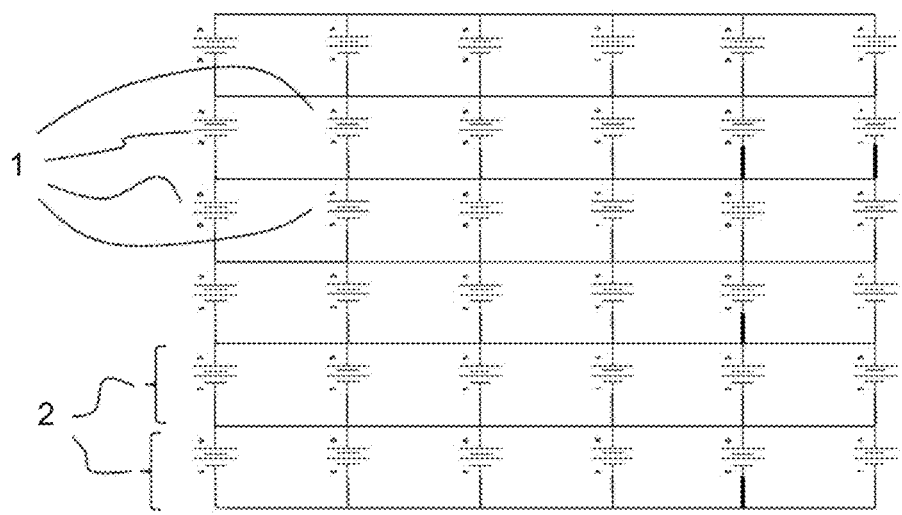
FIG. 1 shows diagrammatically the structure of a prior art battery.
Figure 2:
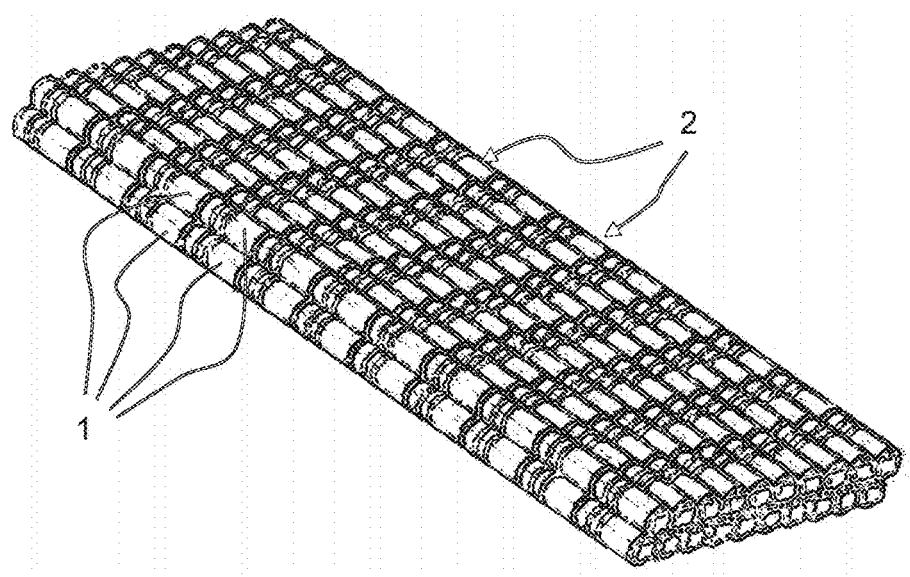
FIG. 2 shows in perspective the real architecture of such a prior art battery.
Figure 3:
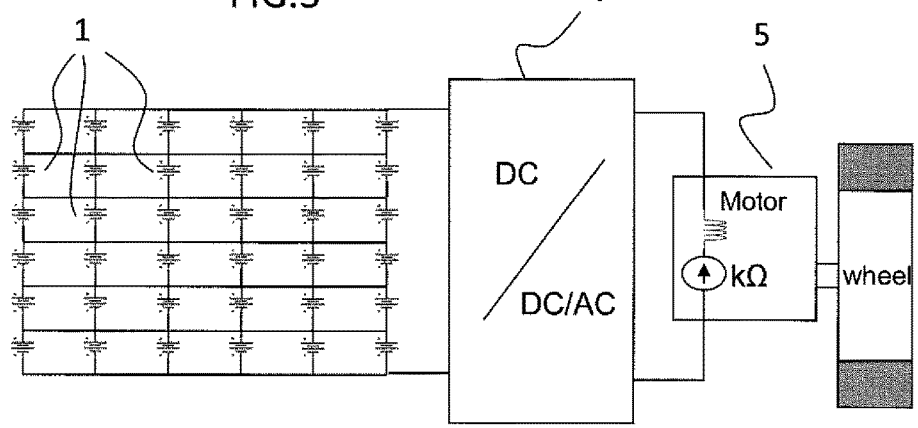
FIG. 3 shows diagrammatically the electrical circuit of a motor using such a prior art battery for its power supply.

This function of regulating the output voltage of the battery enables it to behave like a switched battery type conversion structure, which avoids the use of a DC/DC converter at the output of the battery pack to adjust the voltage to the requirements of the application, and enables use of the battery in accordance with the simplified scheme of FIG. 4, and not like the prior art scheme of FIG. 3.

Figure 25:
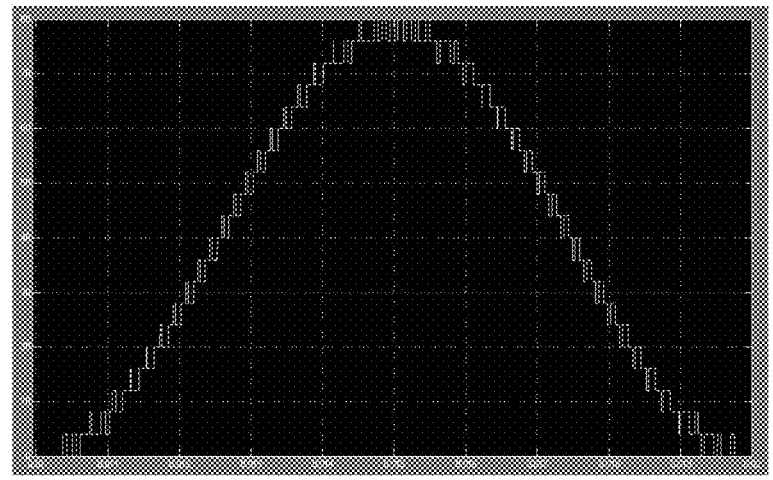
FIG. 25 shows an example of the voltage that may be supplied by the battery in accordance with the invention.

FIG. 25 shows an example of an output wave that can be supplied by the battery when controlled as explained above for a sinusoidal type voltage setpoint at 100 Hz of peak amplitude 40 V and centred on 40 V and for a battery consisting of 20 modules each producing 4 V and the switching frequency of which is limited to 10 kHz (i.e. 100 switching operations per period).

Figure 26:
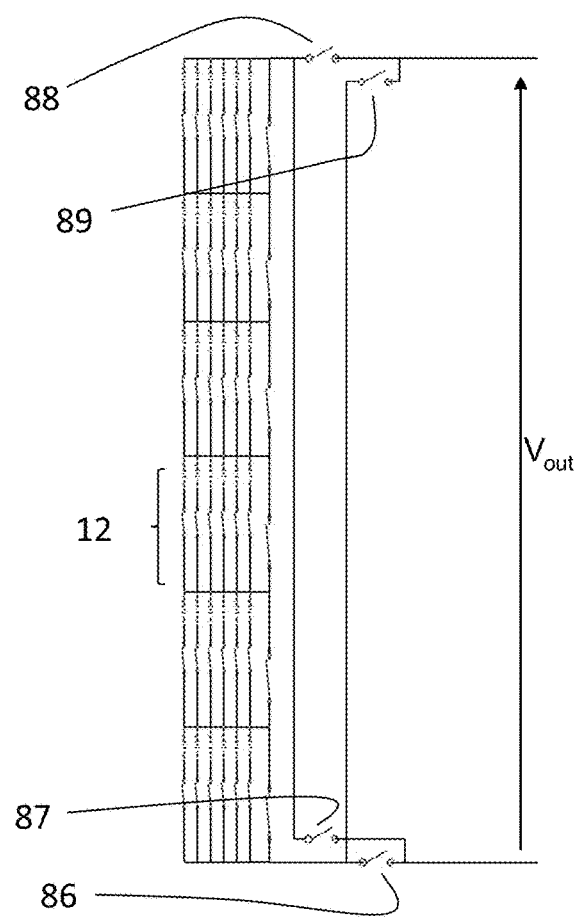
FIG. 26 shows an embodiment of a battery in accordance with the invention featuring an H bridge.

To be able to generate a single-phase voltage centred on 0 V, it must be possible either to use two columns and a differential voltage or to add an H bridge, as shown in FIG. 26, which makes it possible to invert the voltage at the terminals of the battery by means of four switches 86, 87, 88, 89, two switches 86, 87 at the level of a first terminal and two switches 88, 89 at the level of a second terminal. If the two switches 86, 88 are closed and the other two switches are open, the output voltage $V_{out}$ is positive. If the two switches 87, 89 are closed and the other two switches are open, the output voltage $V_{out}$ is negative.

Figure 27:
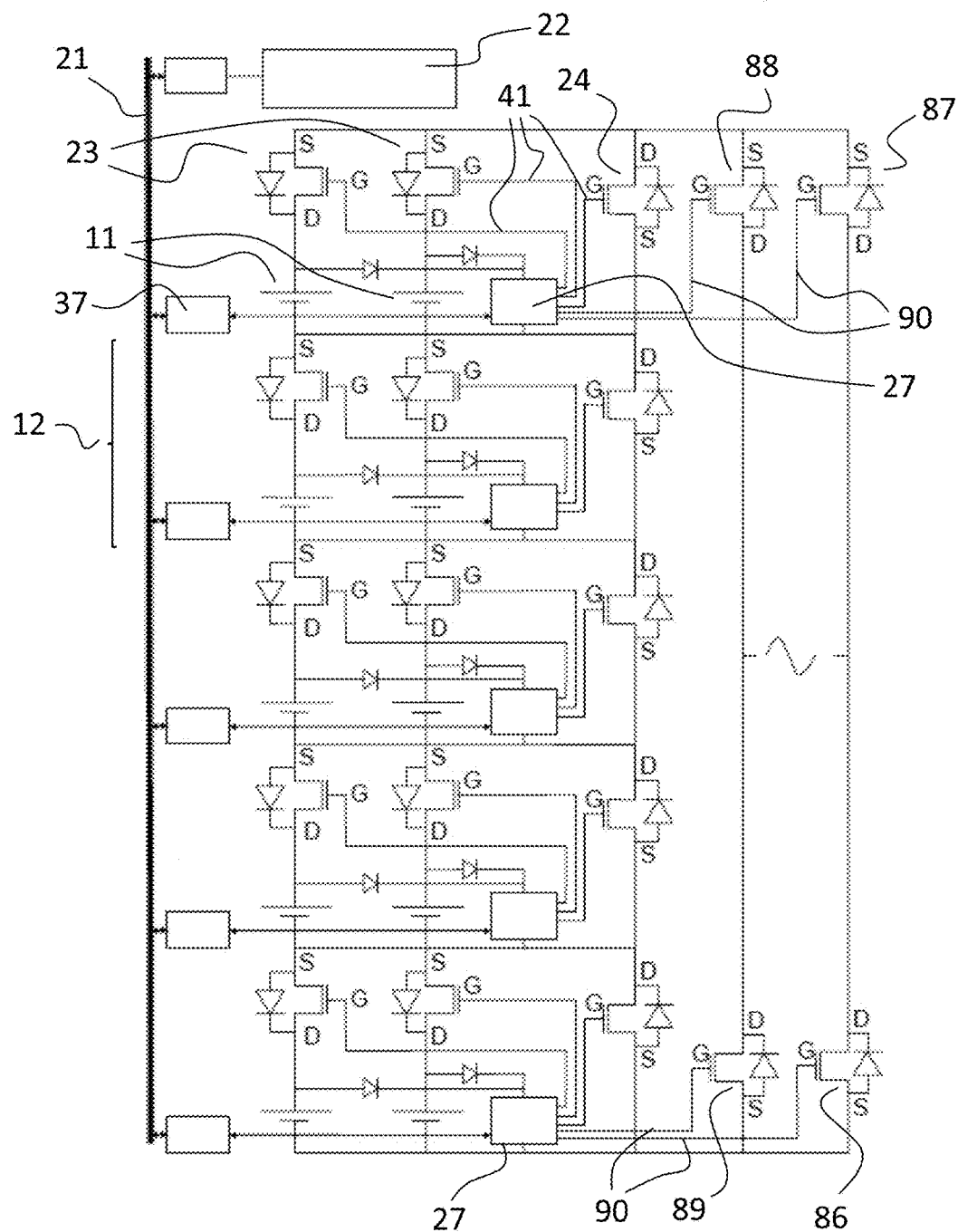
FIG. 27 shows in more detail the architecture of a battery including an H bridge in accordance with one embodiment of the invention.

FIG. 27 shows in more detail the implementation of the principle described with reference to FIG. 26, on the basis of a battery structure as shown in FIG. 11, comprising for example five modules each comprising two cells. For each cell 11, a cell transistor 23 in series with the cell is provided and a module transistor 24 in parallel is provided for each module 12, as explained above. Moreover, at least one sensor for measuring a parameter characteristic of the cell is present at the level of the module, not shown for reasons of simplification. A local control circuit 27 at the level of the module 12 drives the transistors 23, 24 by means of control signals 41, as explained above, at the command of a central computer 22 via the communication bus 21 and an interface 37 providing galvanic isolation. The battery further comprises four switches 86, 87, 88, 89 as described above, which are transistors in this embodiment, driven by the respective control circuits 27 of the top and bottom end modules of the battery via control connections 90.

Note that the method of managing the battery employs optimum switching of the switches 86, 87, 88, 89. For example, if the output voltage must be a sinusoidal voltage, the switching of the transistors is effected when the voltage crosses 0 V, to limit switching losses. If a frequency of 50 Hz is required at the output of the battery, it is necessary to open/close the transistors of the H bridge 50 times per second.

Moreover, the method of managing the battery advantageously also employs intelligent management of the transistors of the H bridge in a similar manner to the steps envisaged for management of the series or module transistors. For example, it is also possible to associate a temperature or current measurement with them and to decide to open a transistor if the measured parameter exceeds a certain threshold, for example in the case of too high a temperature. This measured parameter may naturally be transmitted to a local and/or remote processing circuit in order to implement intelligent management in this way.

The top and bottom end modules of the battery integrate more electronic components than the other modules. All these components are advantageously supplied with electrical power at the voltage available at the level of the module. In this case, the end modules are more loaded than the others. To response to the greater demand, the following solutions are possible:

management of the battery in discharge mode loads the cells of the end modules less to enable them to retain a sufficient charge for switching the switches of the H bridge until the battery is completely discharged; and/or the end modules comprise more cells than the others and/or cells of higher storage capacity; and/or the components of the end modules are also powered from adjacent other modules, which can be envisaged because their potential remains fairly similar.

Moreover, the above operating principle also applies in a similar manner in a phase of charging the battery, which enables the battery to charge directly via its connection to the standard electrical mains. To be more precise, during charging the battery is connected to a voltage source and, as the cells and the transistors have an internal resistance, the circulation of a current in the battery generates a resistive voltage drop, which corresponds to the difference between the voltage imposed by the source and the no-load voltage produced by the various modules in series of the battery. Being able to regulate this difference makes it possible to manage the battery charging current. Accordingly, the battery also employs a charging method that comprises a step of opening and/or closing switches to obtain a required charging current at the level of selected cells. Regulation similar to that described above may be employed, making it possible to determine the number of modules to be placed in series, and which ones, to obtain a charging current setpoint within the battery. As explained above, this method comprises a step of choosing the cells to be charged, taking account notably of their state of charge and their state of health. Note that an inductance may be placed between the source and the battery to smooth the current that circulates between them. This applies in a similar way between the battery and a load. Accordingly, the battery enables charging from the electrical mains in a simplified manner without necessitating any voltage/current type electrical converter.

Figure 28:
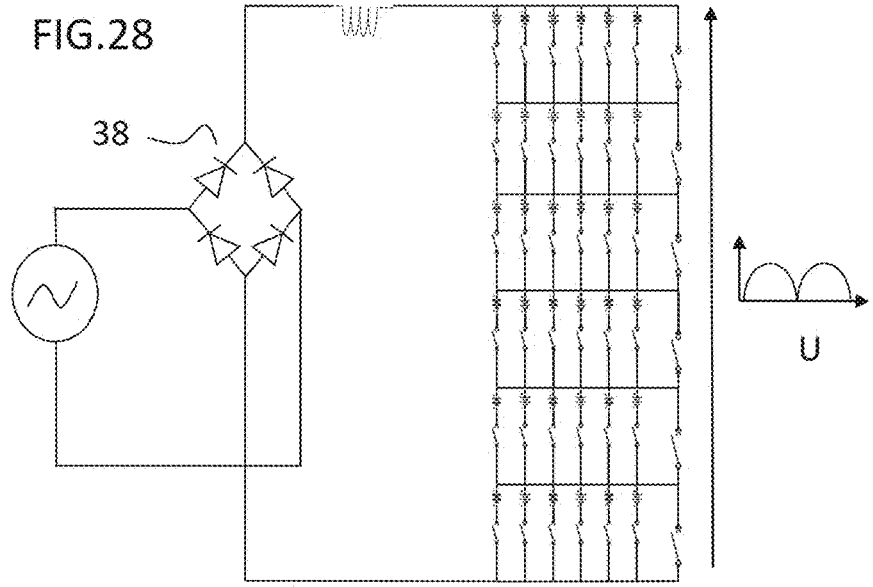
FIG. 28 shows a system for charging a battery in accordance with one embodiment of the invention.

Note that if the battery is not able to generate or absorb a negative voltage, it may nevertheless accept charging from the mains without necessitating a voltage/current type electrical/electrical converter, using a rectifier bridge 38 inserted between the mains and the battery to obtain a positive voltage U at the level of the battery, as shown in FIG. 28.

Finally, the solution described above has numerous advantages, including:

it is based on a multitude of elementary switches, i.e. a multitude of transistors in the preferred embodiment, far away from each other, which makes it easy to evacuate the energy dissipated by their operation, since this dissipated energy takes the form of a multitude of small quantities of energy scattered through the structure of the battery;

it enables balancing of the cells of the battery in real time by dynamic routing of the current;

it enables balancing of the modules of the battery in real time by optimizing the rate of use of each of them;

it enables disconnection of faulty cells;

it enables limitation of the current in cells at too high a temperature by disconnecting the cell, completely or in accordance with a cyclic ratio making it possible to achieve an acceptable average current from the cell;

it enables adjustment of the output voltage of the battery in a gentle manner (low-frequency (<1000 Hz) switching and small voltage steps, for example 4V), without necessitating high-frequency chopping of the full battery voltage; it enables adjustment of a DC voltage required to drive DC motors or to charge from a DC supply; it also enables generation of an AC voltage for driving synchronous or asynchronous motors, etc., or for direct charging from the electrical mains;

it enables individual isolation of a cell of a module, notably enabling measurement of its no-load voltage even if the battery is operating;

it enables isolation of all the cells, for example when the vehicle is stopped or after a major fault is detected, enabling all electrical hazards for the user or persons called upon to work on the vehicle, for example firefighters in the event of a fire, to be circumvented.

By measuring at the same time the voltage of the cells and the voltage of a module of the battery it is possible to deduce from these measurements the voltages at the terminals of the power transistors. It is possible, in some configurations, to detect from these voltages if a transistor is faulty and the current flowing through the cells or module transistors. Accordingly, the battery also employs a method of diagnosing the operation of some or all of the transistors that implement the essential switch functions, which may comprise some or all of the following steps:

if on opening the cell transistors the voltage of the stage remains substantially equal to that of the cells while a current is flowing, this is because at least one of the cell transistors is no longer opening; to find out which one, it suffices to determine through which cell the current flows; accordingly, the diagnostic method comprises a step of commanding opening of all the cell transistors of a module, measuring the voltage of the module, and in the event of a value close to the voltage of a cell, measuring the current flowing through each cell and classifying cell transistors as "faulty" if a current is flowing in them; hereinafter, the module transistor(s) associated with a module in which at least one of the cell transistors is faulty (remains closed) are no longer activated so as not to create short circuits; the method may comprise an additional step of transmitting to a local and/or central unit data relating to the identity of the faulty switches and/or the maximum current that each module can deliver; a user must be able to find out which transistors should be changed;

if in the event of a command to open parallel transistors the voltage of at least one stage remains substantially zero while a current is flowing, then at least one parallel transistor has not opened and is faulty; measuring the current through each module makes it possible to determine the faulty parallel transistor(s); the diagnostic method therefore comprises a step of commanding opening of the parallel transistors, measuring the voltage and the current, and identifying faulty module transistors if the voltage is zero while a current is flowing; hereinafter, the cell transistors associated with a module the parallel transistor of which is faulty (remains closed) are no longer activated so as not to create short circuits; the module concerned is not used again until its module transistor or parallel switches have been replaced;

if in the event of a command to close a cell transistor a voltage drop appears at a transistor while the current in the associated cell is zero, then the cell transistor is faulty and is no longer closing; such a situation limits the current that a module can supply; the central computer of the battery is informed and told the maximum current that the module can still withstand; moreover, the user is advised of the transistor to be changed;

in a similar way, if the command to close a module transistor leads to a voltage drop at the transistor while the current in it is zero, then this means that the transistor is faulty and is no longer closing; this limits the current that the module can pass when the cells are disconnected; the central computer is advised and told the maximum current that the module can still withstand; moreover, the user is advised of the transistor to be changed;

beyond a certain threshold, if a current in a branch is of the opposite sign to the current circulating in the other branches, then a leakage current from the transistor of this branch that is normally open is diagnosed; the central computer is advised and told the maximum current that the module can still withstand; moreover, the user is advised of the transistor to be changed.

The invention is naturally not limited to the above examples. A plurality of measurement sensors per cell may notably be implemented, but alternatively these measurement sensors may be eliminated or other numbers of measurement sensors may be chosen. Moreover, it is possible to use other types of measurement sensor than those described, to measure parameters characteristic of the state of a cell other than voltage, current or temperature. Each cell can take any form and be based on any energy storage technology, without being limited to the lithium-ion technology described in more detail for one embodiment of the invention. Moreover, each energy storage cell may be associated with a local energy source, such as a photovoltaic cell or any form of solar sensor, a thermal sensor, a mechanical/electrical converter, etc.

Moreover, the above embodiments have been described with a cell switch implemented for each cell of the battery. It would nevertheless be possible to obtain an improved battery by managing only some of its cells in accordance with the concept of the invention, and therefore providing cell switches on only some of the cells on the battery, and therefore at least one switch, advantageously on at least two cells of the same module to enable some flexibility in such management. It is possible for some modules not to implement the approach described above and it is possible to conceive of a battery combining conventional modules and modules improved in accordance with the invention. Moreover, a module switch for each module of the battery has been described or alternatively parallel switches associated with each cell. Such switches remain optional and could be dispensed with, in a simplified version of the invention. Moreover, the invention covers all intermediate embodiments integrating one or more module switches and/or parallel switches for only some of the modules.

Finally, to clarify the figures, the examples shown comprise few cells. The embodiments envisaged are nevertheless suitable for implementing batteries able to supply a high output voltage, reaching several hundred volts, for example 250 volts or more. They are therefore suitable for batteries comprising a large number of modules, notably eight or more modules.

Figure 30:
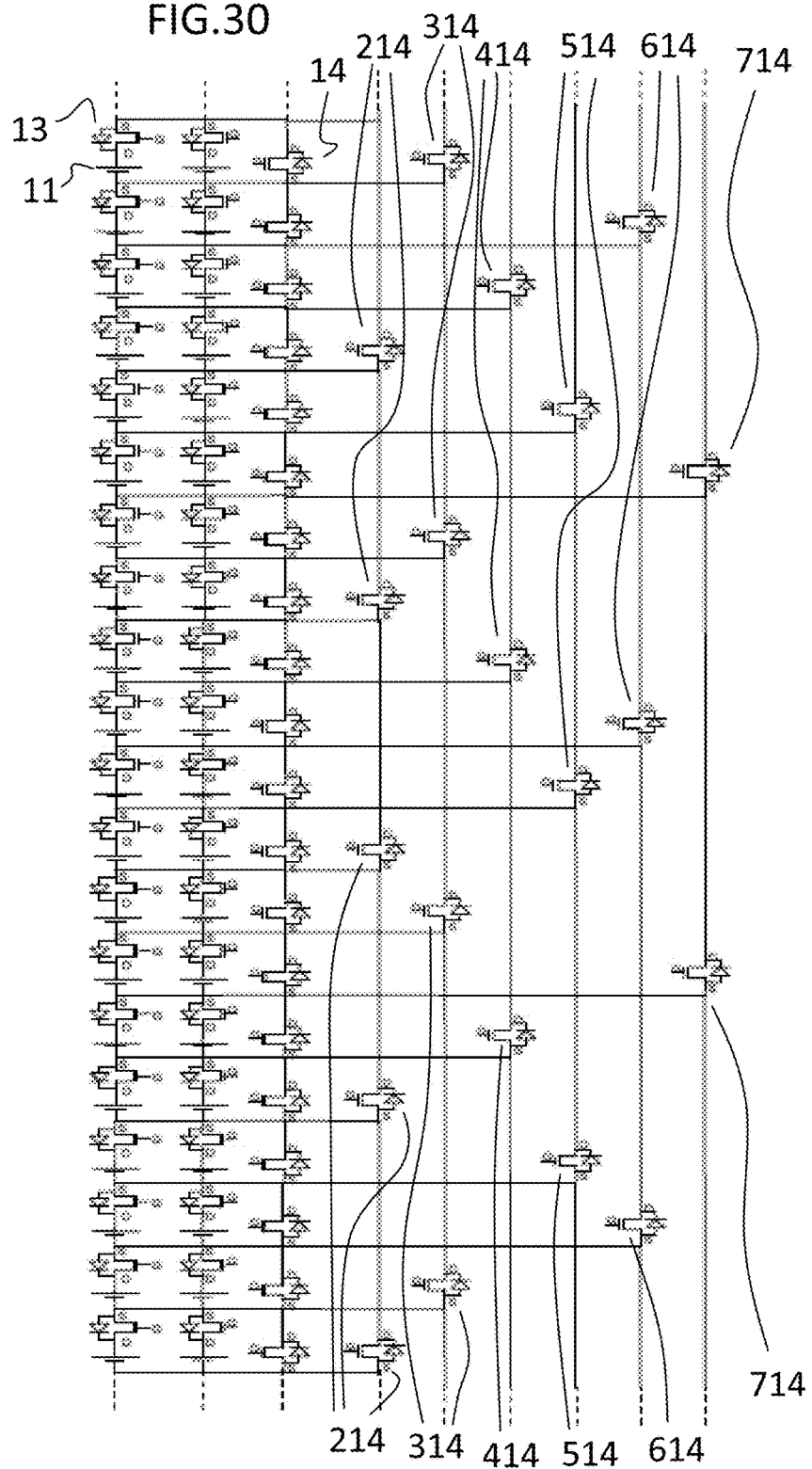
FIGS. 30 to 32 shows three variants of a battery with a plurality of separate parallel switches in accordance with one embodiment of the invention.
Figure 31:
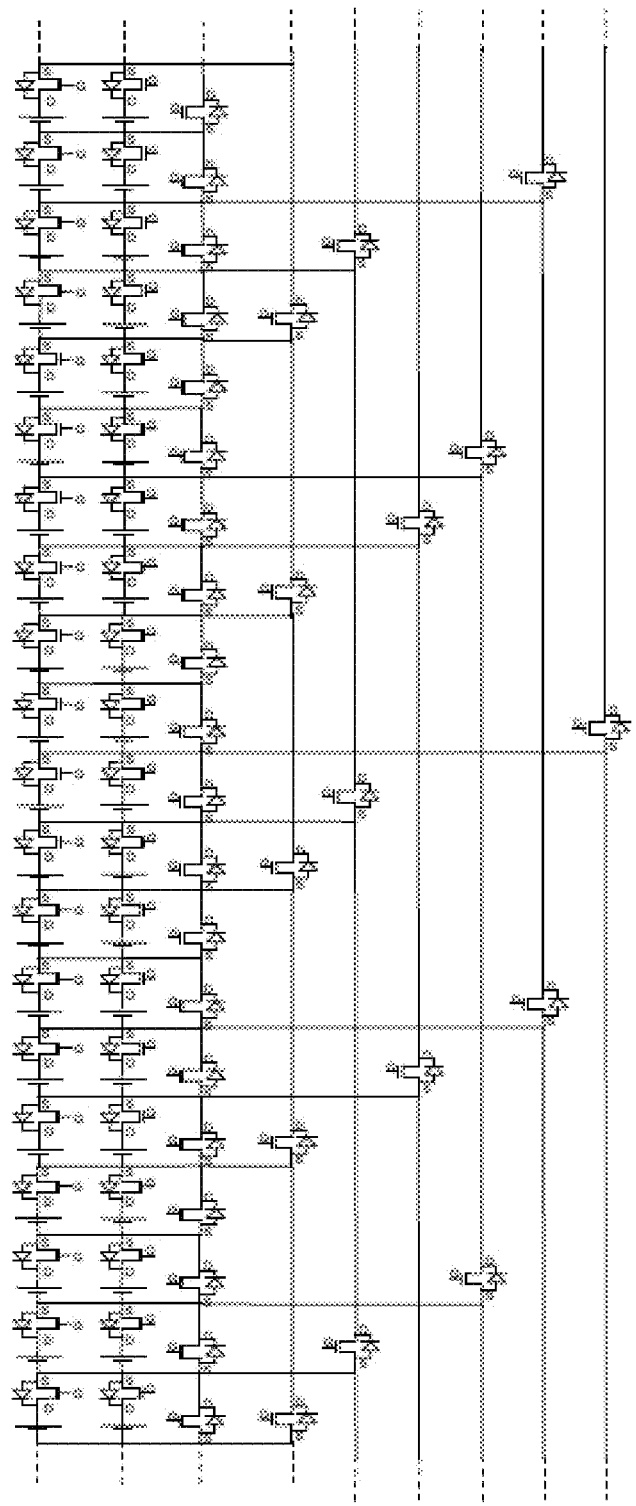
Figure 32:
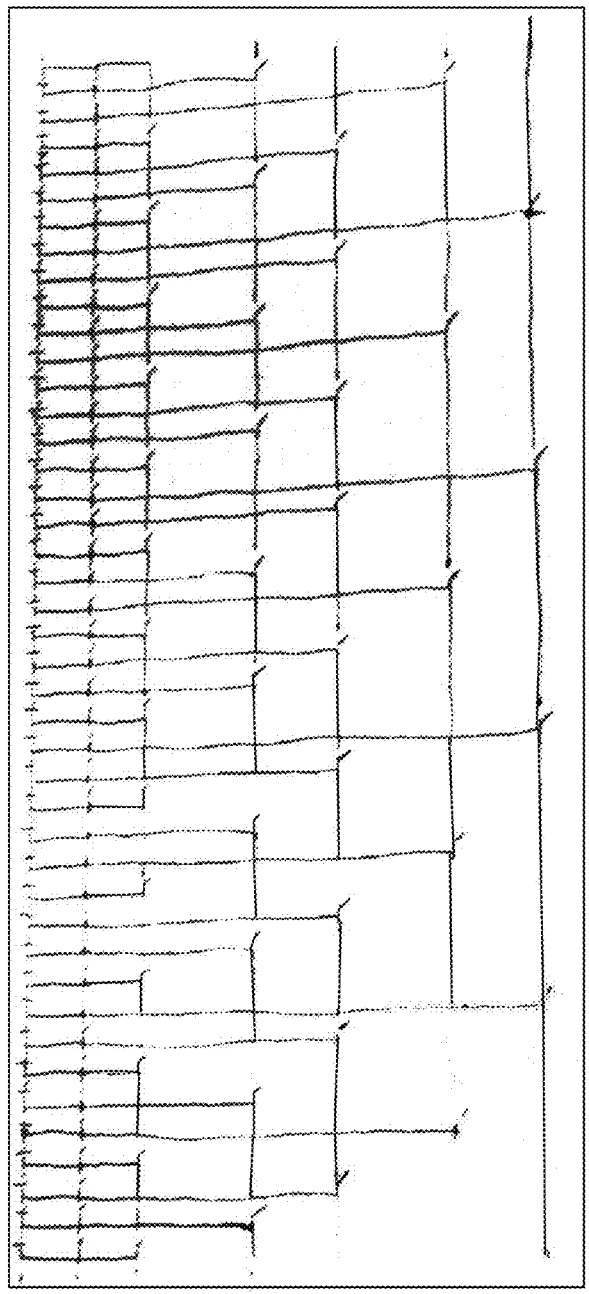

To this end FIGS. 30 to 32 show variants of a shunt function for shunting a plurality of modules of a battery, which are based on complementary switches disposed in parallel with a plurality of modules making it possible to add a current path when a plurality of modules are deactivated, thus limiting losses.

Accordingly, FIG. 30 adds a first series of switches 214 each enabling shunting of four consecutive modules, a second series of switches 314 each enabling shunting of six consecutive modules, a third series of switches 414 each enabling shunting of six consecutive modules offset relative to the second series, a fourth series of switches 514 each also enabling shunting of six consecutive modules offset relative to the previous two series, a fifth series of switches 614 each enabling shunting of eight consecutive modules, and a sixth series of switches 714 each also enabling shunting of eight consecutive modules offset relative to the fifth series.

All the switches of these various series are disposed between the lower and upper terminals of different modules, in parallel with one another. Their management is naturally coherent to avoid creating short circuit situations, as explained for the previous examples.

The two FIGS. 31 and 32 show two other variants based on the same approach.

The advantage of these various embodiments is to add much more direct current paths on deactivating a plurality of modules thanks to switches which shunt a plurality of stages at a time, which causes much lower losses. Accordingly, depending on the number of modules necessary, a substantially optimum configuration is employed at all times to minimize the total resistance of the battery.

The various cell and/or module and/or parallel switches referred to are implemented by means of transistors. NMOS and PMOS transistors have been represented for the most part, but it is nevertheless possible to use bipolar NPN and PNP transistors, which have the advantage that they can be driven with a relatively low voltage, FET, JFET, IGBT, GaN transistors, relays, etc. Alternatively, any type of switch other than those described could be implemented, such as thyristors if the current is inherently reversed when it is required to open it.

The battery of the invention can be managed by an intelligent unit, a computer or a local and/or remote processing circuit accessible via a local communication device, which computer may comprise any software and/or hardware for managing the battery, notably for determining the configuration of its switches. To this end, the battery may integrate any actuation means, any control circuit, for its switches. However, this switch control circuit is powered directly by at least one cell of the battery, preferably a cell of the module on which the control circuit operates or an adjacent module; this same solution is advantageously applied for all the components integrated at the level of the battery and necessitating an electrical power supply. Accordingly, the battery integrates one or more electrical power supply circuits, at the voltage supplied by one or more cells, available at the level of one or more modules. This electrical power supply circuit may be implemented on an electronic card directly in a cell or in the battery or by any other means.

Numerous other variants of the invention may easily be envisaged by simply combining the embodiments and/or variants thereof described above.

Note that communication within the battery and/or with an external unit may be based on a carrier current principle provided that the current demanded by a load or supplied by a source is not too high to allow the disconnection of some cells. As a matter of fact, this principle is based on an intentional alternation of connection and disconnection of some cells of the battery, in order to create an induced current modulation and a power modulation at the level of a module which propagates to the whole of the battery and beyond. This power modulation is therefore seen by the other modules of the battery and by an external load, which makes it possible to use it to transmit information in accordance with any communication protocol, existing and normalized or otherwise. For example a master circuit may be defined that interrogates all the cells in turn by means of their address, each cell then responding in a dedicated time slot. For example, the master circuit may request information such as a measurement of the voltage, current and/or temperature of a certain cell, after which the latter can send the requested information, possibly with a code for reporting a fault. This principle therefore makes it possible for different cells of the battery to communicate simply with each other or to communicate with a central computer or a processing circuit of the battery or an external unit. Note that the current may be modulated without disconnecting a cell completely, but simply by modulating the resistance in the conducting state of the cell transistor, i.e. modulating the gate voltage of the transistor about its bias point. This avoids the cell being completely disconnected and overloading the other cells of the stage that take over to circulate the current. This resistance modulation in the conducting state can also be applied to the module transistor when it is activated. This then makes it possible to communicate even if the stage is deactivated by opening the cell transistors. Carrier current communication makes it possible to modulate a high current at the level of the stage without this generating high electrical losses. As a matter of fact, this modulation of current is effected by modulating a consumption of current simply stored and returned by virtue of belonging to a battery, which means that there are no losses like the losses that exist in a dissipating element such as a resistor or a transistor in linear mode as conventionally used for a carrier current system.

Figure 29:
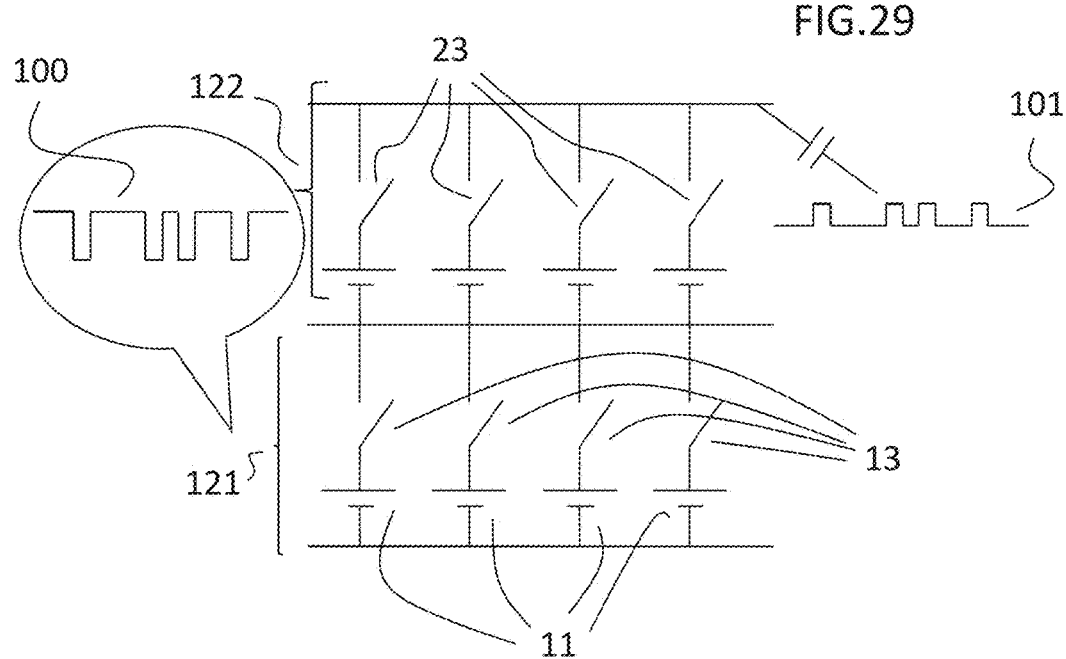
FIG. 29 shows diagrammatically use of the principle of carrier current communication within the battery in accordance with one embodiment of the invention.

Thus FIG. 29 shows diagrammatically the implementation of the principle in which a first module 121 of a battery generates a communication signal 100 by actuating at least one cell switch 13 and a corresponding signal 101 is then received at the level of a second module 122 of the battery.

Figure 33:
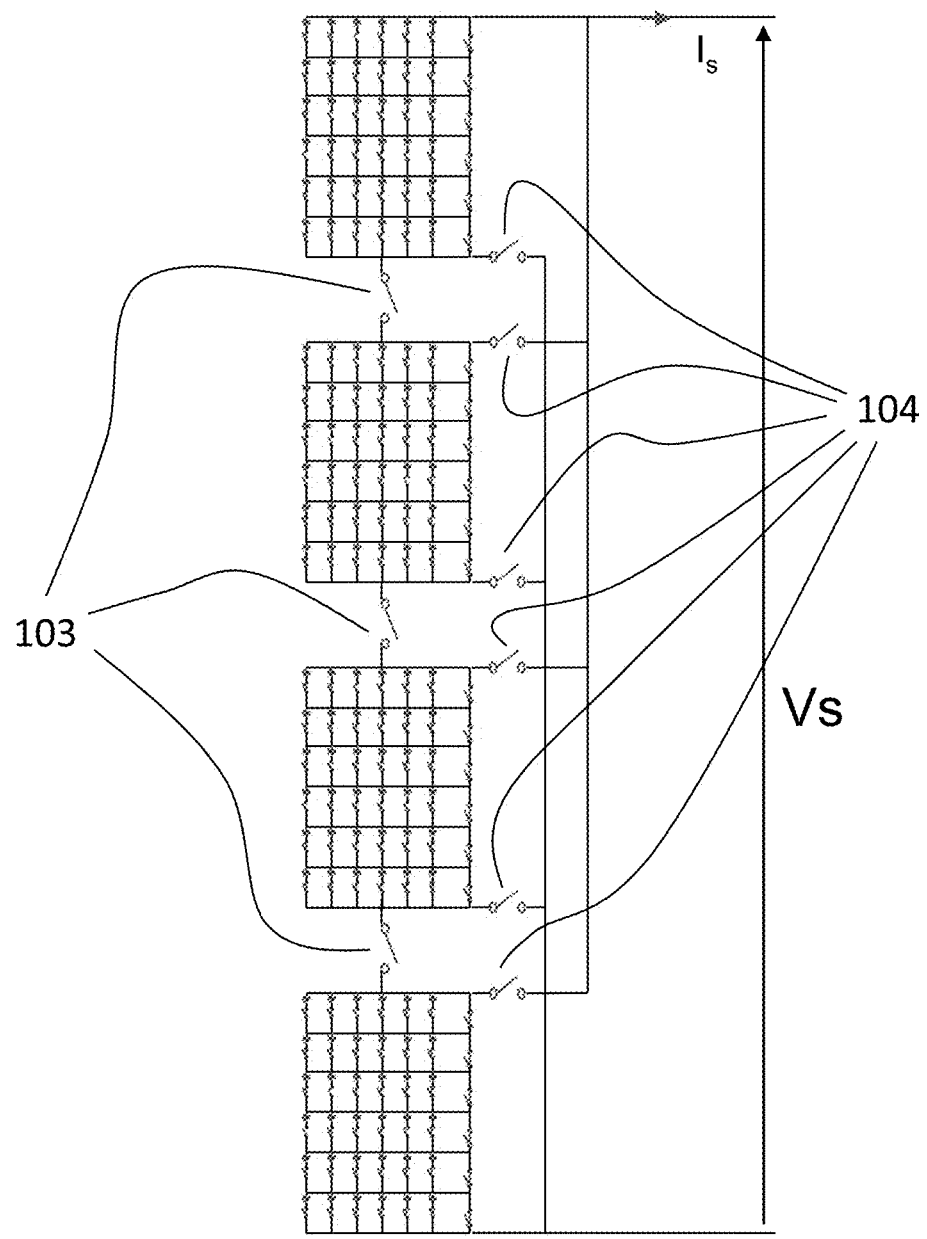
FIG. 33 shows an embodiment of the invention in which the battery is separated into a plurality of parts.

FIG. 33 shows a variant of the embodiment of the invention in which the battery is separated into four equivalent parts or storage subassemblies comprising a plurality of modules made up of a plurality of cells. The structure of these modules integrates the concept described above and here each cell comprises a cell switch and each module comprises a module switch. These various parts may either be in series, as a result of closing first switches 103 connecting them and opening second switches 104, which then represents a geometry as described above with reference to FIG. 4, or on the other hand in parallel, as a result of opening the first switches 103 and closing the second switches 104. Alternatively, any intermediate combination is possible, such as grouping the parts two by two in series, followed by disposing these groups of two parts in parallel. This variant makes it possible to have a choice between a high output voltage Vs or a lower output voltage but an output current Is higher than that which would be obtained with all the parts in series. Accordingly, this structure becomes usable as soon as the desired output voltage is less than that which half the modules can supply. If this voltage is less than a quarter of that which all the modules in series can supply, then the four parts shown may be used in parallel.

Alternatively, the same approach could be implemented with any other number of parts; each module could even represent a part adapted for combination in series or in parallel with the rest of the battery. Moreover, these various parts could be different from each other, not comprising the same number of cells. The method of managing the battery could therefore comprise a step of automatic calculation of the number of parts to be placed in parallel, with a predetermined period, as a function of the voltage and the current demand at the output, followed by a step of actuating the switches 103, 104 in order to obtain the geometry of the battery most appropriate to what is required at the time.

Figure 34:
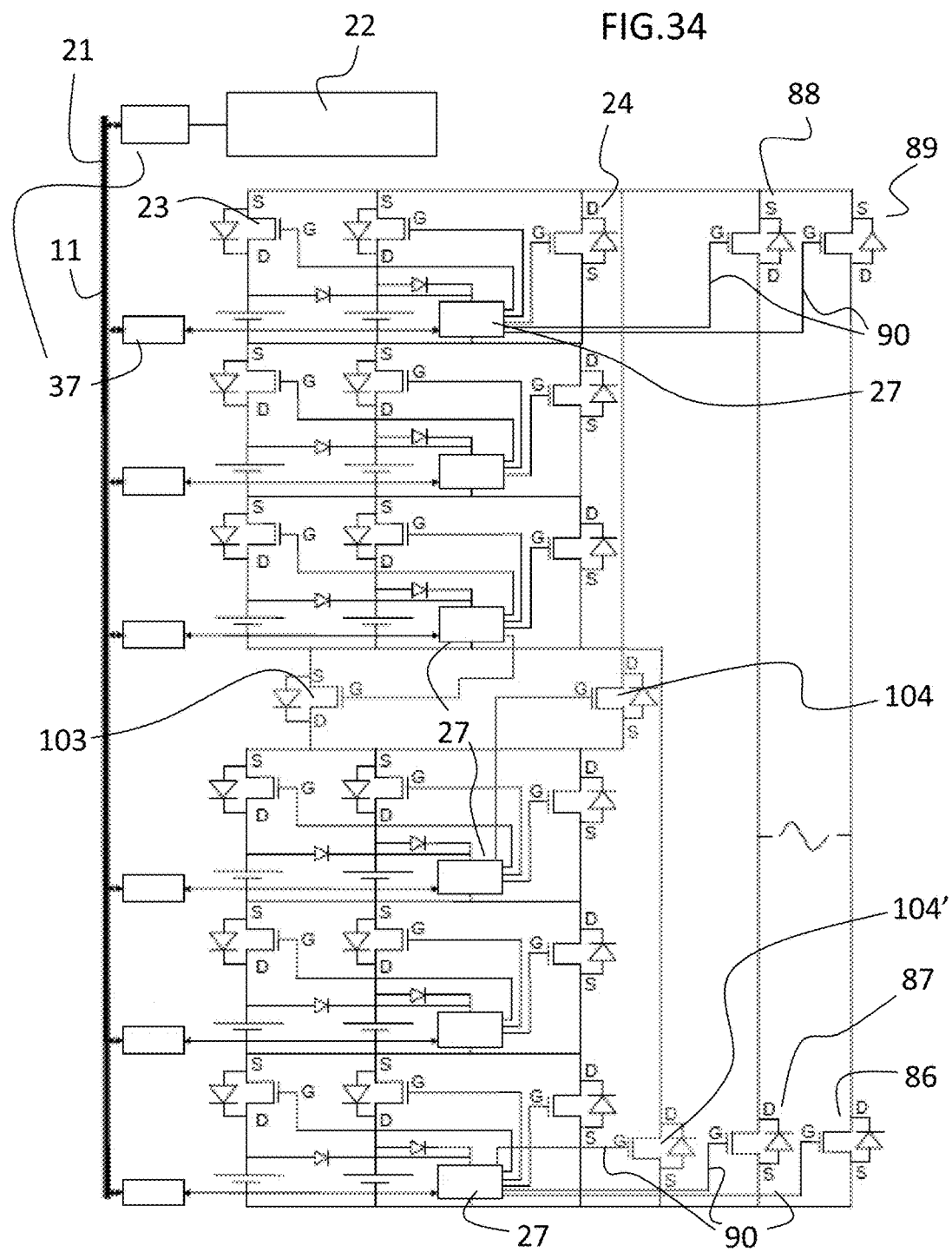
FIG. 34 shows in more detail the architecture of a battery separated into a plurality of parts and including an H bridge in accordance with one embodiment of the invention.

FIG. 34 therefore shows an implementation of the principle described above with reference to FIG. 33. In this example, to obtain a clear representation, the battery comprises only two parts each of three modules. This principle may naturally be duplicated for a battery of around 100 modules, divisible into a multitude of parts. The battery shown corresponds to that described with reference to FIG. 11. All the modules comprise the electronic components already described in detail and are connected to a central computer 22 via a communication bus 21 and a galvanic isolation arrangement 37. The battery is moreover equipped with an H bridge implemented by four switches 86 to 89 as explained above. Finally, the division of the battery into two parts is obtained by adding three transistors forming the switches 103, 104, 104' as explained above. As shown, two transistors 103, 104 are positioned in the central part of the battery so as to be driven by control circuits 27 of the adjacent modules physically arranged on either side of these transistors. Moreover, a transistor 104' is positioned toward the lower end of the battery and is driven by a signal 90 from the control circuit of the lower module of the battery. These switches 103, 104, 104' could naturally be arranged differently within the structure of the battery.

Figure 35:
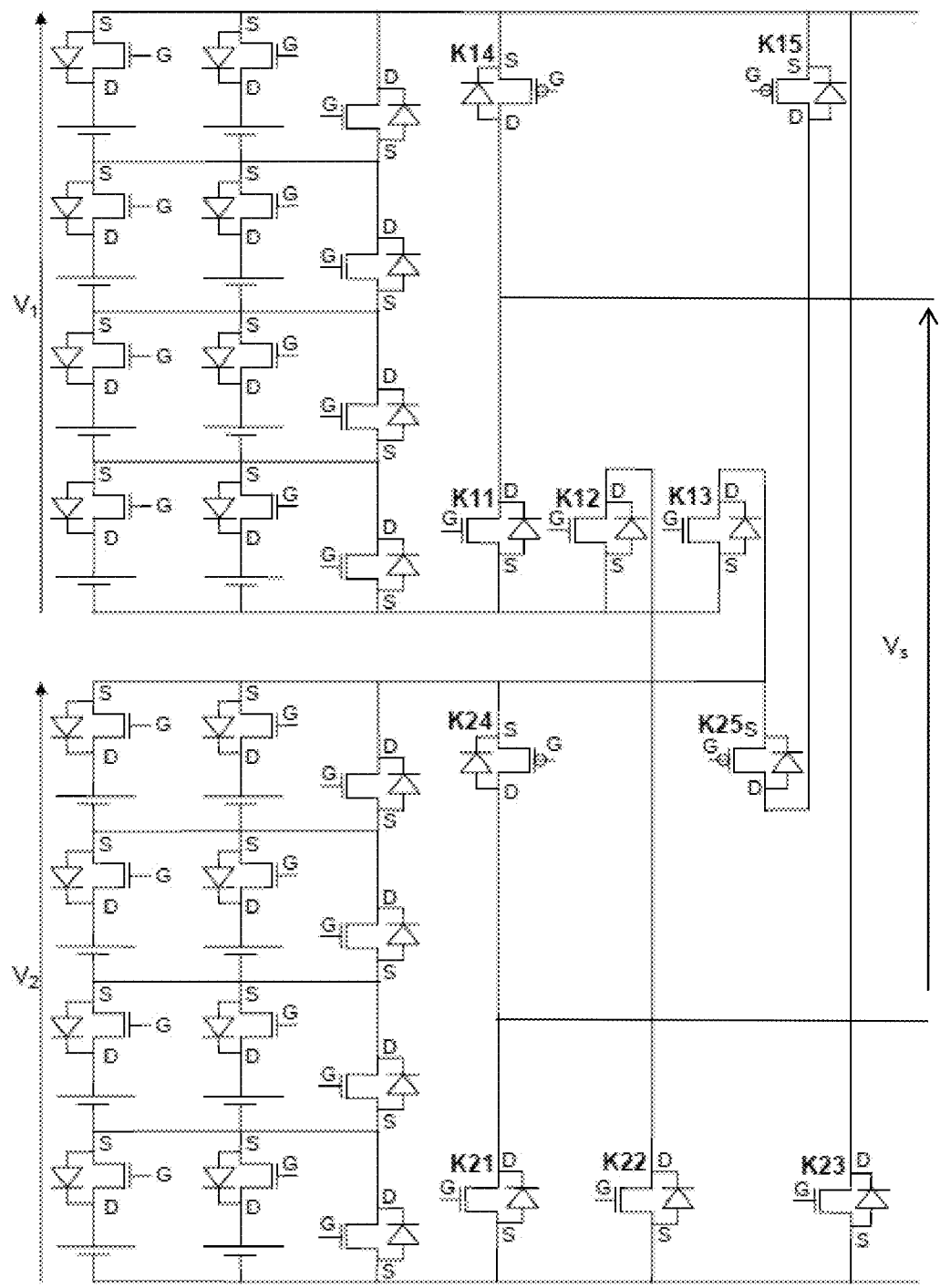
FIG. 35 shows in more detail a variant architecture of a battery separated into a plurality of parts and including an H bridge in accordance with one embodiment of the invention.

Thus FIG. 35 shows another embodiment in which a battery comprises eight modules each of two cells, divided into two parts each of four modules with respective output voltages $V_1$ and $V_2$. This battery further comprises ten MOS transistors, including five transistors K11 to K15 connected to the first part and five transistors K21 to K25 connected to the second part. These ten transistors are controlled directly by the adjacent modules. They make it possible to implement the two functions of voltage inversion and series or parallel connection of the two parts of the battery. This is indeed a solution equivalent to the above scheme. The total output voltage $V_s$ of the battery is in fact defined by the following formulas:

$V_s = V_1 + V_2$ when the transistors K13, K14 and K21 are closed, the others being open, $V_s = -V_1 - V_2$ when the transistors K11, K23 and K24 are closed, the others being open, $V_s = V_1 = V_2$ when the transistors K12, K22, K15, K25, K14 and K21 are closed, the others being open, $V_s = -(V_1 = V_2)$ when the transistors K12, K22, K15, K25, K11 and K24 are closed, the others being open.

This embodiment comprises transistors K14, K15, K24 and K25 that are never subjected to a voltage greater than $V_1$ or $V_2$, which makes it possible to choose low-voltage transistors able to receive a higher current without generating excessive losses. The ten transistors are controlled via electronics that can be powered by and placed on the top and bottom modules of the two parts of the battery, as before. As the source potentials of these transistors are referenced relative to these modules, this simplifies controlling them.

In the case of a battery comprising N modules, if the calculation determines that n modules in series are necessary to obtain a required voltage, then the following calculation may be effected:

if n<N/2 then parallel connection of two parts, dividing the battery into two parts;

if n<N/3, division of the battery three parts, etc.

Alternatively, hysteresis type regulation may be chosen, to avoid switching the switches too often when the voltage demand varies around a limit value like N/2. To this end, it may be decided to divide the battery into p parts when n<N/p−q, where q is an integer constant.

Alternatively, the method of managing the battery may employ any form of regulation around an output current and/or voltage value. If the output voltage is less than the setpoint value, the number n of modules in series is increased, and if it is greater than the setpoint value, then this number n is reduced. To prevent the number n oscillating between two values in an attempt to reach a setpoint value that cannot be reached with an integer value of n, a variation frequency limiter may be used and/or low-pass filtering at the level of the corrector unit in the return loop to achieve regulation with respect to a mean value.

If the battery has to supply an AC voltage or any voltage variable in time with a given period, the parallel connection of different parts of the battery may be decided on based on similar criteria applied to the amplitude of the sinusoid or the variable voltage to be supplied, to prevent switching too often from one mode to another in each period. Overall, the current demand could be higher as the amplitude of the voltage demand is lower.

Accordingly, this variant of the invention makes it possible, at substantially constant power, to modify the output voltage and current values. This solution is perfectly suited to powering motors such as a motor vehicle motor, which may necessitate more torque at low speeds, and therefore a higher supply current, for example climb a steep gradient.

Accordingly, the invention also relates to a motor vehicle as such equipped with a battery as described, removable for rapid exchange thereof or not.

The invention has been described in relation to embodiments in which each stage or module is composed of elementary cells, all associated with switches driven by a control circuit. It is nevertheless possible to conceive of variants in which not all the elementary cells comprise a cell switch and/or not all the modules are controlled in this way, as mentioned above. Accordingly, another, simplified variant consists in an architecture similar to that of FIG. 35 but without the cell switches, which makes it possible to reduce the architecture to only the function of series or parallel connection of the various modules.

Figure 36:
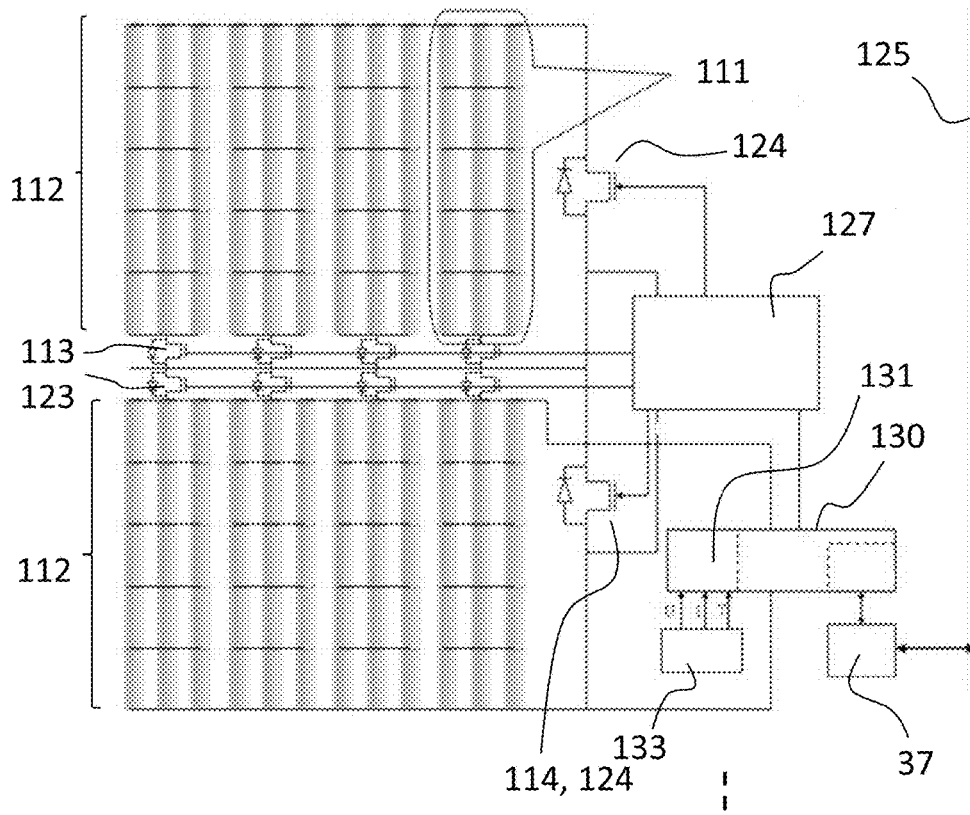
FIG. 36 shows a battery in accordance with one embodiment of the invention grouping a plurality of elementary cells.

To this end, FIG. 36 shows another variant of the invention in which elementary cells 11 are grouped to form larger cells or groups of cells 111. The architecture of the invention is then applied to these groups of cells 111, which are grouped into modules 112 and which are all associated with a cell group switch in the form of a transistor 123, each stage comprising a stage switch in the form of a transistor 124. Accordingly, the invention encompasses any implementation in which the cell considered as an elementary cell in the above embodiments corresponds in fact to a group of cells, which may take the form of a monolithic assembly, the connections of which are fixed and non-modifiable, possibly even taking the form of a casing with at least two external terminals in a format and for a use finally similar to those of an elementary cell as defined above. Throughout the description the term "cell" must therefore be understood as applying to any electricity storage element entity from an elementary cell, such as a lithium-ion battery, to the combination of a multitude of elementary batteries. Note that in the FIG. 36 variant an electronic control device is shared by two stages 112.

This control device drives the transistors 123, 124 forming the switches 113, 114 relative to a low potential of the bottom stage. It comprises various sensors 133, such as a temperature sensor, a voltage sensor and a current sensor, which communicate with a processing circuit 130 via three communication channels. The processing circuit 130 therefore receives this data at the level of a communication input 131 effecting "ADC input" type analogue-to-digital conversion. In one possible embodiment the processing circuit may be a microcontroller having a sufficient number of inputs/outputs for interrogating all the sensors. All the transistors 123, 124 are driven by a power control circuit 127 under the command of the processing circuit 130. Finally, the processing circuit 130 is connected to a central computer, not shown, via a communication bus 125 and an interface 37 forming a galvanic isolation arrangement.

Figure 37:
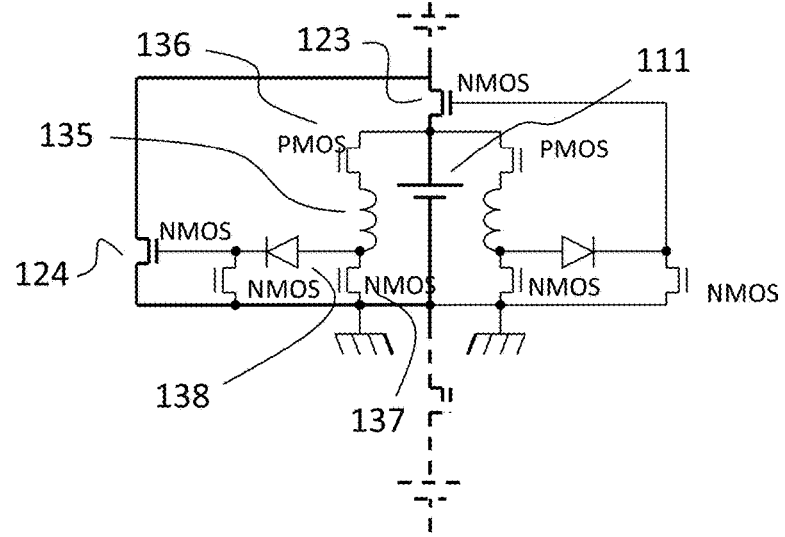
FIG. 37 shows a solution for the control of series and parallel transistors based on a relatively low voltage obtained from the cells.

FIG. 37 shows an embodiment of a circuit for controlling the transistors 123, 124 by discharging an inductance 135 previously charged by closing a PMOS transistor 136 and an NMOS transistor 137 on either side of it. When the inductance 135 is sufficiently charged, the NMOS transistor 137 opens but the PMOS transistor 136 remains closed. The current then passes through the diode 138 to the gate of the module transistor 124, and is sufficient to induce its change of state.

Figure 38:
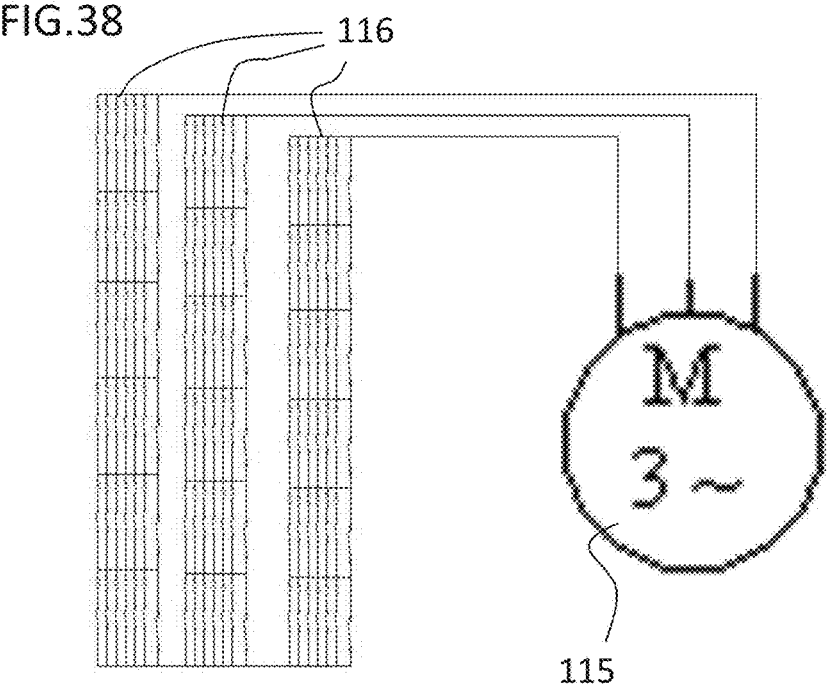
FIG. 38 shows a battery comprising three columns in accordance with one embodiment of the invention adapted to deliver three independent voltages with possible inversion of sign.

On the other hand, the invention is also compatible with a three-phase implementation. FIG. 38 simply shows a battery comprising three power storage columns 116 for powering a three-phase motor 115 each having an architecture similar to a battery in accordance with the invention as described above.

Figure 39:
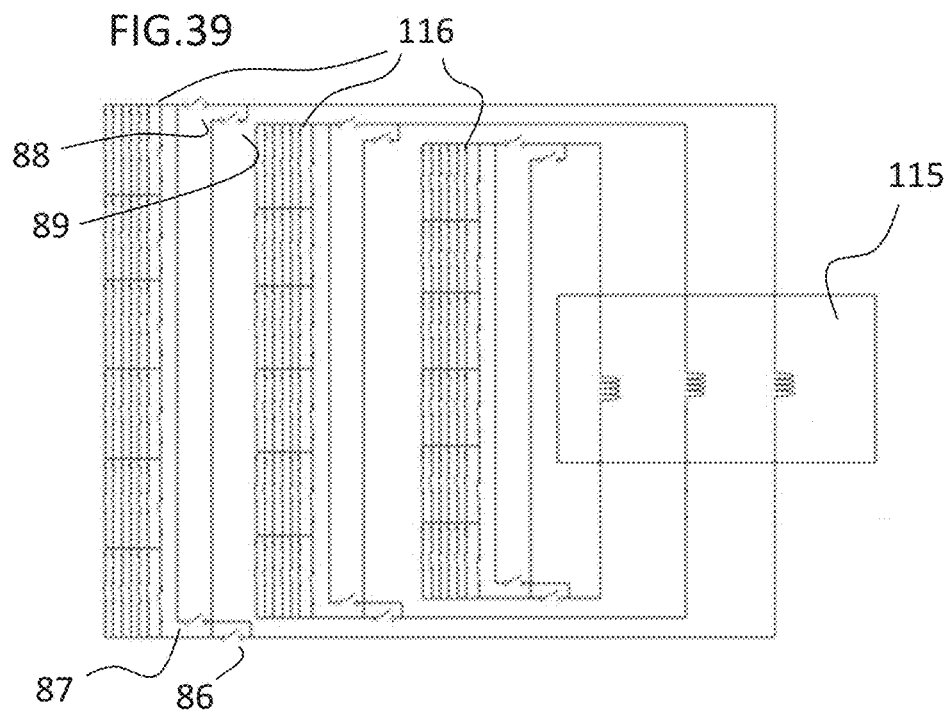
FIG. 39 shows a variant of the battery from FIG. 38 adapted to deliver a three-phase voltage.

FIG. 39 shows a variant in which a battery is adapted to deliver a three-phase voltage to a three-phase motor 115 and that differs from the previous embodiment by virtue of the fact that each column 116 of the battery is equipped with switches 86 to 89, advantageously consisting of transistors, for producing H bridges as explained with reference to FIG. 26. This H bridge makes it possible to double the peak-to-peak control voltage of the motor and thereby to halve the output current for the same output power (Urms*Irms=constant). These switches switch twice per second, i.e. on each change of sign of the output voltage. Compared to that of FIG. 38, this architecture makes it possible to avoid the current supplied by a column moving in the form of a reverse current into another column at certain moments of the period, generating unintentional cycles of charging and discharging the cells. In this solution, the three windings of the three-phase motor 115 may be supplied independently. This isolation can make it possible to isolate galvanically each of the columns 116 of the battery. This isolation may notably be useful if the three columns 116 are separated into three battery blocks physically placed at different locations, for example for reasons of electrical safety in a vehicle.

Figure 40:
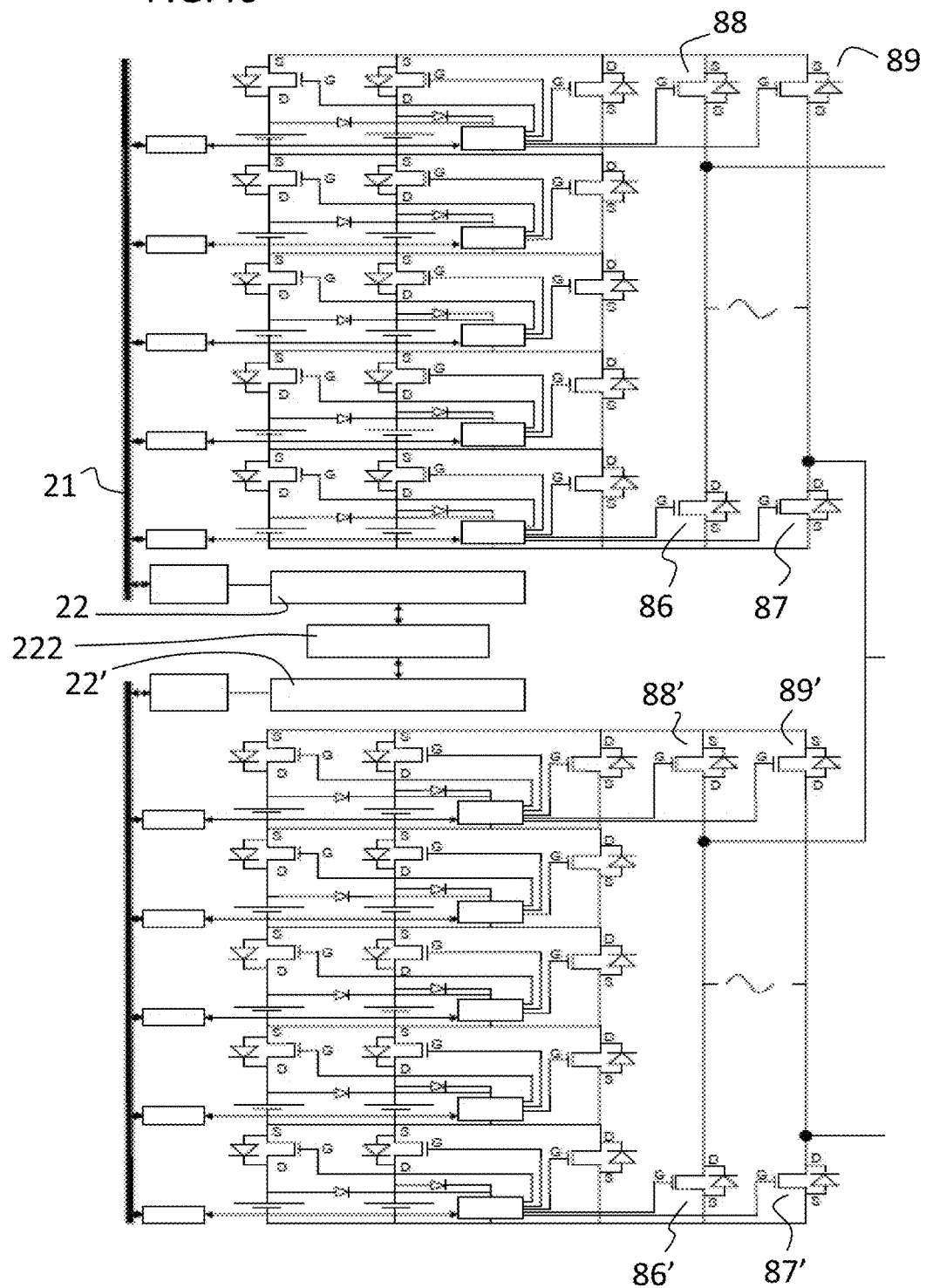
FIG. 40 shows in detail an architecture of a battery delivering a three-phase voltage in accordance with one embodiment of the invention.

FIG. 40 shows another variant making it possible to provide a three-phase supply. The device used comprises the series combination of two battery columns or two structures as described with reference to FIG. 27. As has been shown, each column is adapted to produce a sinusoidal AC output voltage. By applying a phase-shift of $2\pi/3$ to the output voltages of the two columns, it is possible to recover a three-phase voltage at the output of the battery. Note that each column is connected to its central computer 22, 22' by a respective communication bus 21, 21' and these two computers 22, 22' are connected to a main computer 222 which manages the battery as a whole and notably coordinates its two columns.

The three computers therefore share the implementation of the method of managing such a battery. By way of example, the main computer 222 determines the numbers of stages n1 and n2 to be used in the respective columns of the battery. One solution for this is to choose the numbers n1 and n2 in accordance with the following rule:

n1=rounded to the nearest integer [(amplitude of the setpoint peak voltage/voltage of a module)*sin($2\pi f\ t$)]

n2=rounded to the nearest integer [(amplitude of the setpoint peak voltage/voltage of a module)*sin($2\pi f\ t$)]

The computer defines a required output setpoint including the frequency f of the signal and its amplitude. In the case of using the battery to power a motor, the output voltage and current and the speed of the motor can be managed with a servocontrol loop. The numbers n1 and n2 are adjusted at any time t to achieve the setpoint defined by this servocontrol loop.

Additionally, the two computers 22, 22' dedicated to respective columns of the battery determine more precisely the modules (and where applicable the cells) to be used to comply with the numbers n1 and n2 so defined whilst achieving the voltage and current demand values. This choice is made so as to comply with balancing the charge between the different modules. To this end, each computer 22, 22' receives the state of charge and current capacity information from each module of its column, which makes it possible to determine which n1 and n2 modules are specifically used at any time. Accordingly, the cells that make it possible to produce the current demand in the short term are selected and remain connected until the current passes through the peak, which avoids too numerous connections and disconnections of the module. The modules that can supply only a lower current are then used only if the peak current demand is less than the current capacity of these modules.

Moreover, the main computer 222 also transmits the information giving the sign of the voltage demand so that each column can set its H bridge accordingly. In accordance with one advantageous embodiment, this information is transmitted to each column by modifying the sign of the numbers n1 and n2.

Moreover, the management method also comprises a step of transmitting to the main computer 222 information as to the state of charge and the current capacity of each module of the two columns. It is therefore possible to calculate the current and the maximum voltage that the battery can supply so as to take account of this in managing the battery: if required, the main computer 222 can therefore apply limitation of the peak current demand or the peak current absorbed, or even limitation of the speed of the motor in the case of powering a motor.

Finally, all the embodiments of a battery as described above show that it is possible to use different types of switches to implement the various and complementary functions, including:
  cell switches, for connecting or disconnecting a particular cell of the battery;
  parallel switches, for selectively bypassing a particular cell of the battery;
  module switches, for selectively bypassing a module of the battery;
  switches for selectively bypassing a plurality of modules of the battery simultaneously;
  switches for selectively inverting the output voltage of the battery;
  series/parallel changeover switches for connecting certain sub-parts of the battery in series or in parallel;
  finally, it is possible to implement additional switches for disposing two cells in series or in parallel.

In accordance with an advantageous embodiment, as has been described, all these switches are driven by a control circuit powered by at least one cell of the battery itself, i.e. powered locally, without using an external power supply. Moreover, a switch is preferably driven by a sufficiently near control circuit, powered by at least one cell of the nearest or a nearby module, so as to employ voltages of the same order of magnitude between the control circuit and the driven switch, for example the driven transistor. To this end, the choice is advantageously made to drive a switch one of the terminals of which, the source or the drain in the case of an NMOS transistor, for example, is connected to a voltage on a certain module by a control circuit powered by that same module or an adjacent module, to be more precise by at least one cell of one of these modules. More generally, there could be chosen any control circuit the power supply connection of which is to a module for which the potential difference with the terminals of the switch does not exceed a predefined threshold, which would risk damaging the switch, creating an electrical hazard situation. This threshold is defined by safety standards and depends on the type of switch implemented. This local, nearby powering has the second advantage of enabling short control connections between the control circuit and the switch.

It should be noted that the control circuit must then enable reliable actuation of the various switches. If the various modules have a potential difference of 3 V and the switches are of the NMOS type, a control circuit preferably integrates a charge pump for increasing the voltage of 3 V present at its input terminals and uses a higher output voltage to actuate the switches, as a function of the switches. In the case of an NMOS transistor, for example, the choice will be made to feed its gate with a voltage such that the voltage difference between its gate and its source is of the order of 20 V, to guarantee reliable actuation.

Figure 41:
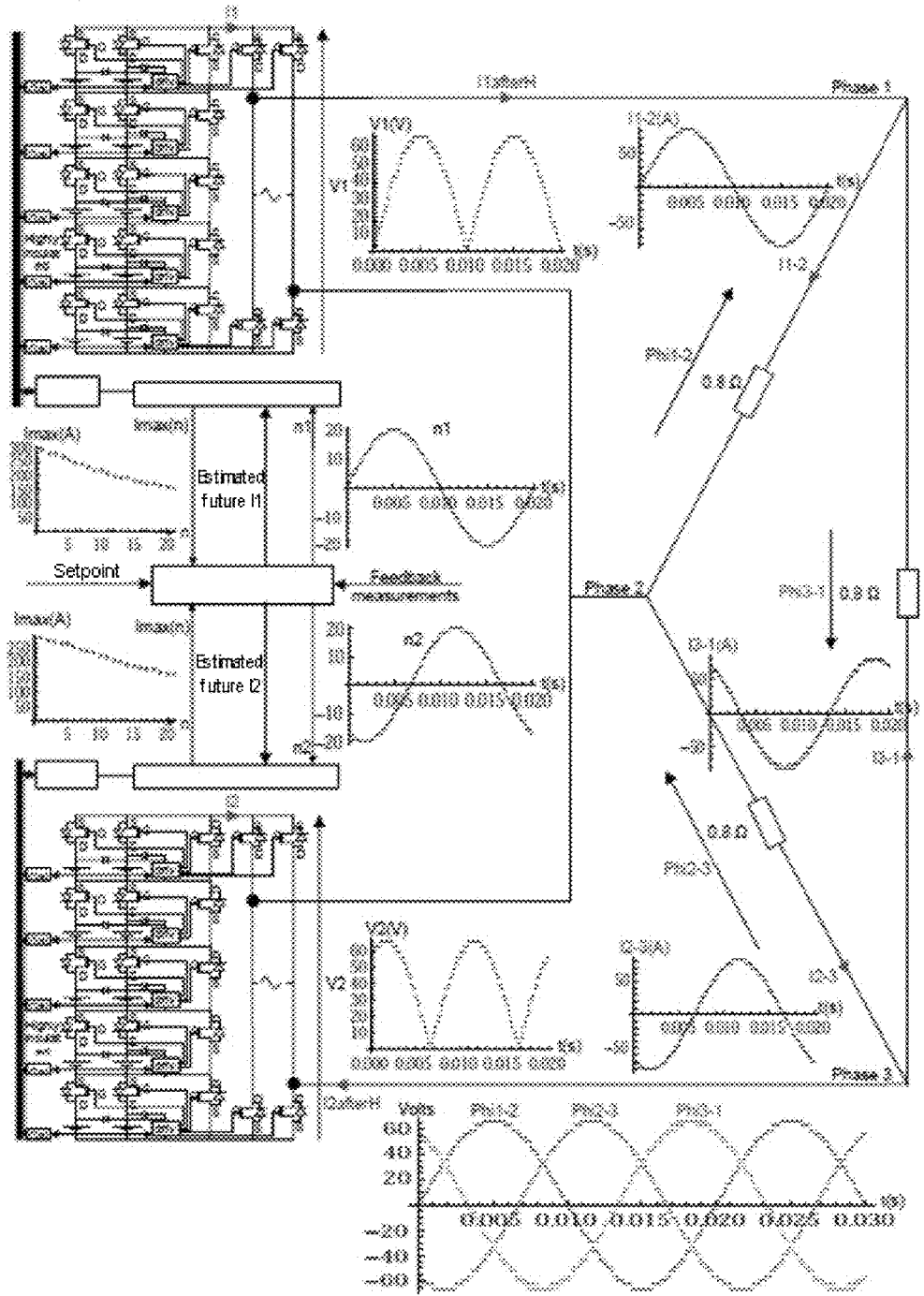
FIG. 41 shows an example of operation of the battery from FIG. 40 delivering a three-phase voltage.

FIG. 41 therefore shows an example of use of such a battery applied to a resistive load, with certain hypotheses as to aging and loss of capacity of certain modules. In a variant that is not shown, the battery may be connected to a three-phase supply to charge it.

Moreover, the architecture of the battery solution described above makes it possible to implement other beneficial functions.

Figure 42:
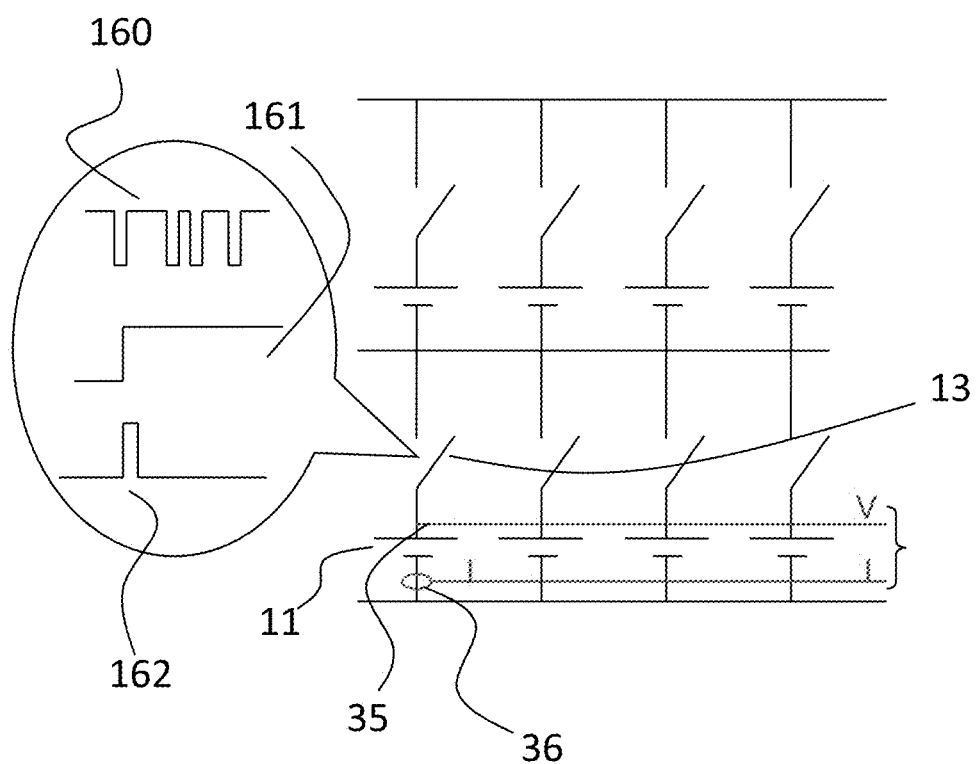
FIG. 42 shows diagrammatically the use of an electrical impedance measurement in accordance with one embodiment of the invention.

A first such function consists in an electrical impedance measurement. For this it is possible to close and/or open the series switch 13 associated with a cell 11 to enable selectively a portion of the current circulating in the battery pack to pass through the cell. By controlling the times at which the current flows in the cell and measuring the current and voltage at the level of the cell 11, it is possible to deduce the complex electrical impedance of the cell. Standard methods such as the response to white noise 160, to a step change 161 or to a pulse 162 for identifying the electrical characteristics of an electrical component, as represented in FIG. 42, are well known. This complex electrical impedance measurement potentially makes it possible to provide additional information over and above the current, voltage and temperature measurements for improved estimation of the state of charge and the state of health of the cell.

This complex impedance measurement on the basis of well-defined control of the series switch is advantageously effected while the other cells of the module take over the current when this series switch is open. Alternatively, it is also possible to effect this measurement on the basis of the normal operation of the battery, which naturally generates current steps in the cells when the cells (or the module) are activated.

If the current consumed in the battery pack is more or less DC or at a low frequency, it may be necessary to use current sensors that pass DC to measure it (sensors that measure the magnetic field in the vicinity of the flowing current, Hall-effect sensors or use of shunt resistors). These sensors have the particular feature of being relatively costly and energy hungry. To circumvent this limitation, it is possible thanks to the architecture adopted to increase artificially the frequency of the current consumed in the cells relative to the current circulating in the load. As a matter of fact, it is possible to alternate the cells used at the level of the modules and to alternate the modules used to generate the output voltage. Fast connection/disconnection of a cell precisely at the moment its current is to be measured may also be employed. This current chopping at the level of the cells or modules facilitates measurement of the current since the frequency of the current is increased. A simple current transformer may be used, for example, which can be integrated directly onto a PCB card carrying the measurement electronics. By disconnecting the cell, the current through the cell is cancelled out and the magnetic material of the current transformer desaturated (saturation linked for example to the circulation of a direct current or a current at a very low frequency). When the cell is reconnected, the current transformer behaves like a real current transformer until the material is again saturated. This is exploited before such saturation to measure the current in the secondary of the transformer. Finally, the cell is temporarily disconnected each time that a current is to be measured.

A second such function is current measurement. The cell may moreover be temporarily disconnected (where appropriate avoiding the current not passing through an antiparallel diode) for calibrating other types of current sensor: it is known that when the cell is disconnected, the current passing through it is zero, which makes it possible to calibrate the zero of the sensor. Other points of the characteristic of the sensor can also be calibrated if a known calibrated current is circulated in the battery pack (for example when recharging the pack), or the current is measured with a calibrated and accurate current sensor at the level of the battery pack. Thereafter, by switching the current from one cell to the other at the level of each stage, by connecting the cells one by one, the current sensor of each cell can be calibrated relative to this current point and likewise for other current points. In the end, if the concept is extrapolated a little further, with a single calibrated, stable and accurate current sensor placed in the battery pack (at the level of a cell or the pack), it is possible with the set of switches to calibrate all the other current sensors of the battery pack. This possibility of real time calibration of the current sensors, notably when the battery pack is operating, makes it possible to use sensors of very low cost (because they do not need to be stable in the long term).

A third such function consists in calibration of the measurement of the state of charge or the state of health of the battery. To calculate the state of charge of a cell, the commonest solution is to measure the voltage at the terminals of the cell. For elementary batteries the active part of which relies on an advanced chemical principle, of the lithium-ion iron phosphate type, the measurement of the voltage is not very accurate because the latter depends on the temperature rather than the state of charge, especially when far from the end of charging or discharging. It is known that, to obtain a more accurate measurement of the state of charge, the current through the cell may be integrated. Starting from a discharged state and integrating the current (stored ampere-hours), and if the capacity of the cell is known (the number of ampere-hours that the elementary battery can store), then by calculating the ratio of these two values it is possible to deduce the state of charge of the cell. This solution is fairly reliable, but it demands regular calibration because the current integration calculation tends to drift in the short term by virtue of inaccuracies in the measurement of the current, leakage currents that are not taken into account, and by virtue of the fact that as it ages the cell loses capacity (the number of ampere-hours that can be stored falls). Calibration is therefore necessary. One solution used at present consists in completely charging and/or discharging the battery pack at the end of a certain number of cycles or a certain time of use. Complete discharging followed by complete charging makes it possible to update the storage capacity of the cell (number of ampere-hours), for example. This operation takes a relatively long time, two to three times longer than the duration of a simple situation of normal charging of the battery. Moreover, this operation consumes energy that is in part lost (during the complete discharge).

To avoid these drawbacks, the battery architecture in accordance with this solution makes it possible to carry out these operations not on the complete battery pack but simply on some of the cells of the battery pack, in order to be able to continue to use the battery pack during these calibration phases, with a total available capacity reduced by only a few percent. Calibration then consists in discharging and charging completely one cell or a few cells of the battery and updating the capacity of the cell and its ampere-hour count. From this analysis of a few cells, it is possible to deduce in part by extrapolation the state of the complete battery pack. So as not to imbalance the number of charge/discharge cycles effected by each of the cells, it suffices to change the cells used for the calibration on each calibration: on each calibration a different series of cells is sampled.

A fourth such function consists in improved operation of the cell. Some cells contain a chemical active part that ages more slowly if their charging or discharging current is chopped. In fact, for the same power dissipated in the cell, it is possible to achieve higher "peak" currents if the current is applied for only a certain proportion of the time, in a chopped manner, since the losses are reduced. This higher peak current is also reflected in the cell by a peak voltage a little higher than the normal voltage of the cell and this tends to move the ions in the cell with more energy, which tends to encourage their migration from one electrode to the other and to some degree improves their insertion into the receiving electrode. This principle enables the cell to limit its loss of storage capacity from one charge/discharge cycle to another and therefore to slow down its aging. In the context of the chosen architecture, it is easy to chop the current in the cells of the battery, alternating the passage of the overall usable current from one cell to the other, for example, by connecting the cells with a certain cyclic ratio (with a phase-shift in the connection/disconnection of the various cells of a stage) or alternating activation of modules, by activating the switches concerned, at the same time as ensuring the correct voltage level at the output.

Note that some or all of the cells of a battery as described above may be associated with a local power source, for example of the solar sensor, thermal sensor, mechanical/electrical converter, etc. type to employ this source for charging it, for example, and/or to provide additional possibilities for the supply of energy by the battery.

The invention claimed is:

1. Battery comprising:
   a plurality of modules disposed in series, each module comprising:
   a lower terminal adapted to be connected to a lower module,
   an upper terminal adapted to be connected to an upper module,
   plural branches between the lower terminal and the upper terminal, the plural branches each comprising a cell and a cell switch disposed in series, wherein the cell switch is configured for connecting or disconnecting the cell of the battery, and
   at least one parallel switch, provided on an additional branch, for selectively bypassing a particular cell or module and/or plurality of modules of the battery simultaneously,
   wherein each of the plurality of modules comprises a control circuit for controlling the cell switches and the at least one parallel switch of a given module and is electrically powered directly by at least one cell of the given module or an adjacent module, and
   a local or remote intelligent device configured to open and close the cell switches and the parallel switches of the battery in real time at a cell switching frequency to convert a voltage of the battery to supply a sinusoidal output without using a DC/AC converter.

2. Battery according to claim 1, wherein it comprises a control circuit of at least one switch disposed at the level of a given module that is electrically powered directly by at least one cell of the given module or an adjacent module, said at least one switch being selected from:
   a switch for selectively inverting the output voltage of the battery;
   a series/parallel changeover switch for disposing in series or parallel certain sub-parts of the battery;
   an additional switch for disposing two cells in series or parallel.

3. Battery according to claim 1, wherein it comprises a plurality of cells each associated with a cell switch disposed in series with the cell, controlled by one or more control circuits each at the level of a given module electrically powered directly by at least one cell of the given module or an adjacent module.

4. Battery according to claim 1, wherein it comprises a control circuit connected via a diode to at least one cell of a module of the battery for supplying it with electrical power.

5. Battery according to claim 1, wherein it comprises a control circuit connected to at least one cell of a module of the battery via a transistor controlled by the voltage or the current available at the level of said module.

6. Battery according to claim 5, wherein the transistor is controlled by the voltage or the current available at the level of said module via an amplifier device.

7. Battery according to claim 4, wherein the control circuit is connected to all the cells of a module of the battery.

8. Battery according to claim 1, wherein it comprises at least one sensor for measuring a parameter characteristic of the state of a cell associated with a cell and in that a control circuit controls the cell switch of said cell as a function of the parameter characteristic of its state.

9. Battery according to claim 8, wherein it comprises a sensor for measuring the current at the level of a cell or a sensor for measuring the voltage at the terminals of a cell or at the terminals of its cell switch and/or a sensor for measuring the temperature of a cell or for impedance spectrometry measurements.

10. Battery according to claim 7, wherein it comprises one or more processing circuits at the level of a given module electrically powered directly by at least one cell of the given module of the battery or a central computer that drives the switches of the battery via the control circuit as a function of at least one measurement of the parameter characteristic of the state of the cell.

11. Battery according to claim 1, wherein it further comprises a communication module associated with a given module, comprising an interface for communication with a central server or with at least one other module and/or a processing circuit associated with a given module electrically powered directly by at least one cell of the given module or an adjacent module.

12. Battery according to claim 1, wherein it comprises an electronic card comprising:
    terminals for connection to cells of the battery, and
    cell switches for one or more modules, and
    a control circuit of the cell switches, and
    a circuit for electrically powering the control circuit from at least one cell of the battery.

13. Battery according to claim 12, wherein it comprises an electronic card disposed between each module of the battery or a single electronic card on which are disposed all the cells of the battery or a plurality of electronic cards each associated with a plurality of modules.

14. Battery according to claim 1, wherein it comprises at least one cell comprising a cell switch and a control circuit powered directly from the cell and integrated inside the exterior casing of the cell.

15. Battery according to claim 1, wherein it comprises an H bridge for inverting the output voltage of the battery provided by four switches, these four switches being provided on the one hand by two transistors disposed at the level of the upper end module and controlled by a control circuit disposed at the level of or near said module and on the other hand two transistors disposed at the level of the lower end module and controlled by a control circuit disposed at the level of or near said module.

16. Battery according to claim 1, wherein it comprises switches for modifying the series or parallel assembly of sub-assemblies of the battery and in that these switches are controlled by at least one control circuit disposed at the level of a module of the battery.

17. Battery according to claim 1, wherein the cell switch is a transistor.

18. Battery according to claim 1, wherein it comprises a plurality of casings disposed in series and comprises a rack with locations for removably accommodating the casings, a location comprising electrical contacts for the electrical connection of a casing with the terminals of the battery via a power bus, the location being associated with a rack switch so as to be able to maintain an electrical output in the absence of a certain casing in a certain location via at least one other casing disposed in another slot of the rack.

19. Method of managing a battery according to claim 1, the method comprising:
    a step of electrically powering a control circuit of a switch disposed at the level of a given module of the battery from at least one cell of the given module or an adjacent module, and
    a step of opening or closing cell switches and/or parallel switches of the battery in real time to convert a voltage of the battery in order to supply a sinusoidal output voltage.

20. Battery management method according to claim 19, wherein it comprises a step of electrically powering by at least one cell of the battery all other electronic components internal to the battery necessitating a power supply.

21. Management method according to claim 19, wherein it comprises the following steps:
    measuring at least one parameter at the level of a cell of a given module of the battery representative of the state of the cell;
    transmitting said measured parameter to at least one processing circuit or a computer;
    determining the position of a cell switch taking into account said measured parameter;
    commanding opening or closing of the cell switch via the control circuit powered by the given module or an adjacent module.

22. Battery management method according to claim 21, wherein it comprises a step consisting in comparing the measured parameter to a threshold to diagnose the state of the cell, estimate the state of charge of the cell or estimate its state of health.

23. Battery management method according to claim 22, wherein it comprises a step of opening the cell switch when the cell is holding a charge below a threshold or is overcharged or is faulty or overheating.

24. Battery management method according to claim 19, wherein it comprises a step of cyclic opening/closing of the cell switch associated with a cell, the cyclic ratio being fixed as a function of the total time of use of said cell, in turn determined as a function of the overall current and voltage demand from the battery and as a function of the diagnosis of the cell concerned.

25. Battery management method according to claim 19, wherein it comprises some or all of the following steps:
    balancing the modules or cells with one another, giving priority to using the modules or cells carrying the highest charge when the battery is connected to a load and the modules or cells carrying the lowest charge when charging the battery;
    balancing the modules or cells by modifying the average rate of use of the modules or cells but without using the same modules and/or cells continuously so that the charging of the modules or cells is balanced;
    choosing the modules to use as a function of the current that they can supply;
    limiting the use of the modules or cells at the highest temperature or giving preference to using them when the current demand is lower;
    maintaining a homogeneous temperature within the battery.

* * * * *